(12) United States Patent
Arisankala et al.

(10) Patent No.: US 11,716,314 B2
(45) Date of Patent: *Aug. 1, 2023

(54) SYSTEM AND APPARATUS FOR ENHANCED QOS, STEERING AND POLICY ENFORCEMENT FOR HTTPS TRAFFIC VIA INTELLIGENT INLINE PATH DISCOVERY OF TLS TERMINATING NODE

(71) Applicant: Citrix Systems, Inc., Fort Lauderdale, FL (US)

(72) Inventors: J Mohan Rao Arisankala, Bengaluru (IN); Chaitra Maraliga Ramaiah, Bengaluru (IN); Karthick Srivatsan, Bengaluru (IN)

(*) Notice: Subject to any disclaimer, the term of this patent is extended or adjusted under 35 U.S.C. 154(b) by 94 days.

This patent is subject to a terminal disclaimer.

(21) Appl. No.: 17/307,634

(22) Filed: May 4, 2021

(65) Prior Publication Data

US 2021/0281551 A1 Sep. 9, 2021

Related U.S. Application Data

(63) Continuation of application No. 16/209,070, filed on Dec. 4, 2018, now Pat. No. 11,025,601.

(51) Int. Cl.
*H04L 9/40* (2022.01)
*H04L 9/08* (2006.01)
(Continued)

(52) U.S. Cl.
CPC ........ *H04L 63/0485* (2013.01); *H04L 9/0861* (2013.01); *H04L 67/141* (2013.01);
(Continued)

(58) Field of Classification Search
CPC . H04L 63/0485; H04L 9/0861; H04L 67/141; H04L 67/143; H04L 67/01;
(Continued)

(56) References Cited

U.S. PATENT DOCUMENTS 8,782,393 B1* 7/2014 Rothstein ............ H04L 63/0281
726/13
2003/0226018 A1 12/2003 Tardo et al.
(Continued)

FOREIGN PATENT DOCUMENTS

CN 101141243 A 3/2008
CN 102948131 A 2/2013
(Continued)

OTHER PUBLICATIONS

Examination Report on EP Appl. No. 19828001.8 dated May 10, 2022.
(Continued)

*Primary Examiner* — J. Brant Murphy

(57) ABSTRACT

Described embodiments provide systems and apparatuses for enhanced quality of service, steering and policy enforcement for https traffic via intelligent in-line path discovery of a TLS terminating node. The system may include a first network device having a secure connection traversing through the first network device, and in communication with a second network device. The first network device and the second network device may be intermediary to a client device and a server. The first network device may determine that the second network device terminates the secure connection. The first network device may receive key generation information of the secure connection from the second network device following determining the second network device terminates the secure connection. The first network device may decipher packet(s) of the secure connection destined for the device or the server using the received key generation information, to regulate network traffic of the secure connection at the first network device.

20 Claims, 9 Drawing Sheets

(51) Int. Cl.
*H04L 67/141* (2022.01)
*H04L 67/143* (2022.01)
*H04L 69/16* (2022.01)
*H04L 67/01* (2022.01)

(52) U.S. Cl.
CPC ............ *H04L 67/143* (2013.01); *H04L 67/01* (2022.05); *H04L 69/16* (2013.01)

(58) Field of Classification Search
CPC ....... H04L 69/16; H04L 63/061; H04L 45/24; H04L 45/302; H04L 45/7453; H04L 47/32; H04L 47/24; H04L 47/825; H04L 63/0227; H04L 63/0272; H04L 63/0464; H04L 63/166
See application file for complete search history.

(56) References Cited

U.S. PATENT DOCUMENTS

| | | | | |
|---|---|---|---|---|
| 2009/0083538 | A1* | 3/2009 | Merugu | H04L 63/0281 713/153 |
| 2010/0031042 | A1* | 2/2010 | Di Crescenzo | H04L 9/32 713/168 |
| 2010/0177730 | A1* | 7/2010 | Okuda | H04W 72/085 370/329 |
| 2011/0264904 | A1* | 10/2011 | Hua | H04W 28/18 709/227 |
| 2011/0264905 | A1* | 10/2011 | Ovsiannikov | H04L 63/0281 713/151 |
| 2012/0039337 | A1* | 2/2012 | Jackowski | H04L 47/2441 370/392 |
| 2012/0117615 | A1* | 5/2012 | MacKinnon | H04L 63/0263 726/1 |
| 2013/0305038 | A1* | 11/2013 | Sproles | H04L 63/0485 713/152 |
| 2014/0115702 | A1* | 4/2014 | Li | H04L 63/0464 726/23 |
| 2018/0103018 | A1 | 4/2018 | Chauhan et al. | |
| 2018/0144380 | A1* | 5/2018 | Herken | G06Q 20/384 |
| 2018/0376317 | A1* | 12/2018 | Kim | H04L 69/24 |

FOREIGN PATENT DOCUMENTS

| | | |
|---|---|---|
| WO | WO-2005/034052 A1 | 4/2005 |
| WO | WO-2017/007725 A1 | 1/2017 |

OTHER PUBLICATIONS

International Search Report and Written Opinion for International Appl. No. PCT/US2019/064012, dated Feb. 14, 2020.
Non-Final Office Action on U.S. Appl. No. 16/209,070 dated Oct. 16, 2020.
Notice of Allowance on U.S. Appl. No. 16/209,070 dated Feb. 5, 2021.
Examination Report for AU Appl. No. 2019392368, dated Mar. 22, 2022.
International Preliminary Report on PCT Appl. PCT/US2019/064012 dated Jun. 17, 2021.
Examination Report for EP Appl. No. 19828001.8 dated Nov. 26, 2021.
Examination Report on EP Appl. No. 19828001.8 dated Nov. 17, 2022.
First Office Action on CN Appl. No. 201980090872.2 dated Nov. 1, 2022 (35 pages).

\* cited by examiner

SYSTEM AND APPARATUS FOR ENHANCED QOS, STEERING AND POLICY ENFORCEMENT FOR HTTPS TRAFFIC VIA INTELLIGENT INLINE PATH DISCOVERY OF TLS TERMINATING NODE

CROSS-REFERENCE TO RELATED APPLICATION

This application is a continuation of and claims priority to and the benefit of U.S. patent application Ser. No. 16/209,070, titled "SYSTEM AND APPARATUS FOR ENHANCED QOS, STEERING AND POLICY ENFORCEMENT FOR HTTPS TRAFFIC VIA INTELLIGENT INLINE PATH DISCOVERY OF TLS TERMINATING NODE," and filed on Dec. 4, 2018, the contents of all of which are hereby incorporated herein by reference in its entirety for all purposes.

FIELD OF THE DISCLOSURE

The present application generally relates to communicating network packets, including but not limited to systems and methods for in-line path discovery of a terminating node for network regulation.

BACKGROUND

In a typical computing environment, a client (also referred to as a client device) receives information, traffic, packets, etc., from a server. Packets may be encrypted by a server or client device using various cryptographic algorithms prior to transmission over a network. In some instances, the packets may be communicated between the server and the client device, through one or more network or other intermediary devices. In some instances, a secure connection may be established between the server and client device.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

This disclosure is generally directed to systems and apparatuses for enhanced Quality of Service (QOS), steering, and/or policy enforcement for HTTPS traffic via intelligent in-line path discovery of Transport Layer Security (TLS) terminating node. Some network devices (e.g., intermediary devices such as Netscaler devices) may act as a proxy for another device and may, therefore, perform functions or actions on behalf of the other device. Network devices (e.g., intermediary devices, including middle boxes, appliances, gateways, etc., such as Software-Developed Wide Area Network (SDWAN) devices) which do not act as a proxy for a server or client device can lack the ability to decipher network traffic communicated over Transport Layer Security (TLS), or other secure connection. As more cloud-based network applications, including some high priority network applications, use a secure connection, such network devices cannot inspect data which is communicated through such network devices using the secure connection. These network devices may not be capable of inspecting the data because they are not involved in setting up a secure channel that passes through them, and do not have the proper cryptographic information to decrypt the data, etc.

In some embodiments, inspection of data may be helpful for performing traffic and policy regulation and network management for an enterprise and its branches. Where such traffic is encrypted, network devices which pass through the encrypted traffic and do not act as a proxy may not decrypt and interpret the traffic. Such network devices may lack cryptographic information, keys or secrets, which are needed for decrypting and interpreting the traffic. In these network devices' inability to decrypt the network traffic, these network devices cannot perform functions such as policy-based network traffic management. Hence, these network devices have or support limited Quality of Service (QoS). Furthermore, for a network device to adopt policy enforcement and enterprise management frameworks, the network devices would have to intercept and decrypt the traffic, inspect the traffic, and/or take actions on the traffic in accordance with policies for users or applications at each branch of the enterprise. By deciphering traffic, Software-Developed Wide Area Networks (SDWAN or SD-WAN) devices may be used for developing central enterprise management frameworks, and network devices may intelligently decrypt traffic and perform intelligent application steering based on, for instance, uniform resource locator (URL) or other information in traffic. As such, the embodiments described herein can provide enhanced QoS of network devices by providing network devices the ability to understand and interpret traffic, and perform critical policy enforcement for all branches or datacenter of an enterprise, network or organization.

The embodiments described herein can provide seamless interception/inspection of Hypertext Transfer Protocol Secure (HTTPS) connections or other secure connections. The embodiments described herein can implement URL-based application steering. The embodiments described herein can provide a central framework for performing firewall actions and making security decisions on enterprise traffic. The embodiments described herein can provide enhanced QoS using an intelligent and adaptive application priority-based traffic management on encrypted connections. The embodiments described herein can provide a secure trusted zone between a server side network device and the HTTPS terminating node, thus ensuring a secure network connection for passing credentials from the HTTPS terminating node to another network device. Since, in some implementations, the network devices are not a proxy, the network devices may achieve desired aspects of encrypted traffic analysis and management while minimizing computational expenses.

Network devices may be or include SDWAN devices, which may be transparent intermediate network devices that overlay a Wide Area Network (WAN). SDWAN devices may perform certain WAN optimizing functionalities and provide value-added features. However, certain embodiments of SDWAN devices can lack the ability to fully participate in Session Description Protocol (SDP) operations since they do not have access to cryptographic information to decipher data or traffic communicated across a secure connection. Some embodiments described herein can provide a seamless method of providing the ability to participate in SDP capabilities. The SDWAN devices may be provided with key generation information for deciphering encrypted traffic communicated across a secure connection. Such embodiments can provide network devices the ability to participate in SDP operations and thereby apply filters, steer network traffic based on a URL, and the like.

In some implementations, the network devices can intercept network traffic without terminating the secure connections by using the server certificate and private-key decryption methods. However, such implementations may be limited to deciphering network traffic in a secure connection that uses Rivest-Shamir-Adleman (RSA) key exchange, and such secure connections may not be recommended for servers to enable because using RSA key exchange does not support perfect-forward-secrecy. The network device may not be permitted to decipher traffic with the server's certificate and private key where the traffic is across a secure connection which uses key exchange algorithms supporting perfect-forward-secrecy, such as Diffie-Hellman (DH), Elliptic-Curve DH (ECDH), etc. As modern applications and servers move away from RSA key-exchange in network connections handshake, network devices may fail to decipher the TLS traffic. Another approach is to terminate the secure connection on the network device with the same certificate and private key as the server. Such an approach can be computationally expensive and challenging as the network device acts as both server and client.

According to the embodiments described herein, a network device can decipher secure connection traffic without installing a server certificate and private key on the network device, and without terminating the secure connection at the network device, for instance. Such embodiments can maintain the secure connection beyond the network device and provides for the network device's participation in SDP. In particular, the network device may intercept, decrypt, and inspect traffic. The network device may then forward the original encrypted traffic or perform other traffic routing/filtering on the traffic.

A second network device (e.g., a Netscaler application delivery controller (ADC) device) on the server-side network may terminate a secure connection. A first network device (e.g., SDWAN device, at client device side or origin for instance) intermediary between the second network device and client device may determine that the second network device terminates the secure connection. The first network device may obtain key information from the second network device, and may intercept TLS sessions to apply for instance URL filters and perform URL based traffic steering.

The first network device may set TCP options to determine whether the secure connection is terminated by the second network device. In some embodiments, a third network device (also on the server-side network located between the first and second network device) such as a SDWAN device, may receive the TCP options from the first network device and pass those TCP options to the second network device. The third network device may wait for an acknowledgement message from the second network device. Where the second network device terminates the secure connection, the second network device may respond to the TCP options with TCP options indicating that the second network device terminates the secure connection. The third network device may receive an acknowledgement message from the second network device (which may or may not include the TCP options indicating the second network device terminates the secure connection). The third network device may establish a secure channel with the second network device. The third and/or first network device may buffer application data, while permitting exchange of other data that can be used for performing a handshake and establishing the secure channel(s). The first network device may determine, based on the acknowledgement message received from the second network device via the third network device, that the second network device terminates the secure connection. The third network device may request key generation information (or other secrets, keys, etc.) from the second network device. Upon receipt of the key generation information from the second network device, the third network device may pass the key generation information to the first network device. The first network device may generate a cryptographic key using the key generation information. The first network device may inspect secure connection data, identify a URL for the data, for instance, and make network traffic regulation decisions.

In one aspect, this disclosure is directed to a system. The system may include a first network device having a secure connection traversing through the first network device. The first network device may be in communication with a second network device. The first network device and the second network device may be intermediary to at least one client device and at least one server. The first network device may be configured to determine that the second network device terminates the secure connection. The first network device may be configured to receive key generation information of the secure connection from the second network device responsive to determining that the second network device terminates the secure connection. The first network device may be configured to decipher one or more packets of the secure connection destined for the at least one client device or the at least one server using the received key generation information, to regulate network traffic of the secure connection at the first network device.

In some embodiments, the first network device is configured to generate a cryptographic key using the key generation information, to decipher the one or more packets of the secure connection. In some embodiments, the first network device is configured to perform at least one of packet filtering or routing, responsive to inspecting the deciphered one or more packets. In some embodiments, the first network device is configured to set one or more transmission control protocol (TCP) options in a packet communicated to the second network device. In some embodiments, the one or more TCP options set in the packet communicated to the second network device causes the second network device to respond with a packet indicating that the second network device terminates the secure connection.

In some embodiments, the system includes a third network device intermediary between the first network device and the second network device. The secure connection may pass through the third network device and the first network device. In some embodiments, the third network device is configured to establish a secure channel between the third network device and the second network device. In some embodiments, the third network device is configured to send handshake data from the first network device to the second network device, and hold data for transmission via the secure connection, other than the handshake data, until the key generation information is received or a time-out event occurs. In some embodiments, the third network device is configured to request the key generation information from the second network device, and to receive the key generation information via a secure channel between the third network device and the second network device. In some embodiments, the third network device is configured to send the received key generation information to the first network device.

In another aspect, this disclosure is directed to a method. The method may include determining, by a first network device in communication with a second network device and having a secure connection traversing through the first network device, that the second network device terminates the secure connection. The first network device and the second network device may be intermediary to at least a client device and at least a server. The method may include receiving, by the first network device, key generation information of the secure connection from the second network device, responsive to determining that the second network device terminates the secure connection. The method may include decoding, for inspection by the first network device using the received key generation information, one or more packets of the secure connection destined for the at least one client device or the at least one server, to regulate network traffic of the secure connection at the first network device.

In some embodiments, the method further includes generating, by the first network device, a cryptographic key using the key generation information, to decode the one or more packets of the secure connection. In some embodiments, the method further includes performing, by the first network device, at least one of packet filtering or routing, responsive to inspecting the decoded one or more packets. In some embodiments, the first network device is further configured to set one or more transmission control protocol (TCP) options in a packet communicated to the second network device. If the second network device terminates the secure connection, the one or more TCP options set in the packet communicated to the second network device may cause the second network device to respond with a packet indicating that the second network device terminates the secure connection.

In some embodiments, a third network device is intermediary between the first network device and the second network device, and the secure connection traverses through the third network device and the first network device. In some embodiments, the method includes sending, by the third network device, handshake data from the first network device to the second network device. The method may include holding, by the third network device, data for transmission via the secure connection, other than the handshake data, until the key generation information is received or a time-out event occurs. In some embodiments, the method includes requesting, by the third network device, the key generation information from the second network device. The method may include receiving, by the third network device, the key generation information via a secure channel between the third network device and the second network device. In some embodiments, the method may include sending, by the third network device, the received key generation information to the first network device.

In another aspect, this disclosure is directed to a non-transitory computer readable medium storing program instructions for causing one or more processors to determine, at a first network device in communication with a second network device and having a secure connection traversing through the first network device, that the second network device terminates the secure connection. The first network device and the second network device may be intermediary to at least a client device and at least a server. The program instructions may further cause the one or more processors to receive, at the first network device, key generation information of the secure connection from the second network device, responsive to determining that the second network device terminates the secure connection. The program instructions may further cause the one or more processors to decipher, at the first network device using the received key generation information, one or more packets of the secure connection destined for the at least one client device or the at least one server, to regulate network traffic of the secure connection at the first network device.

In some embodiments, the program instructions cause the one or more processors to generate, at the first network device, a cryptographic key using the key generation information, to decipher the one or more packets of the secure connection.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
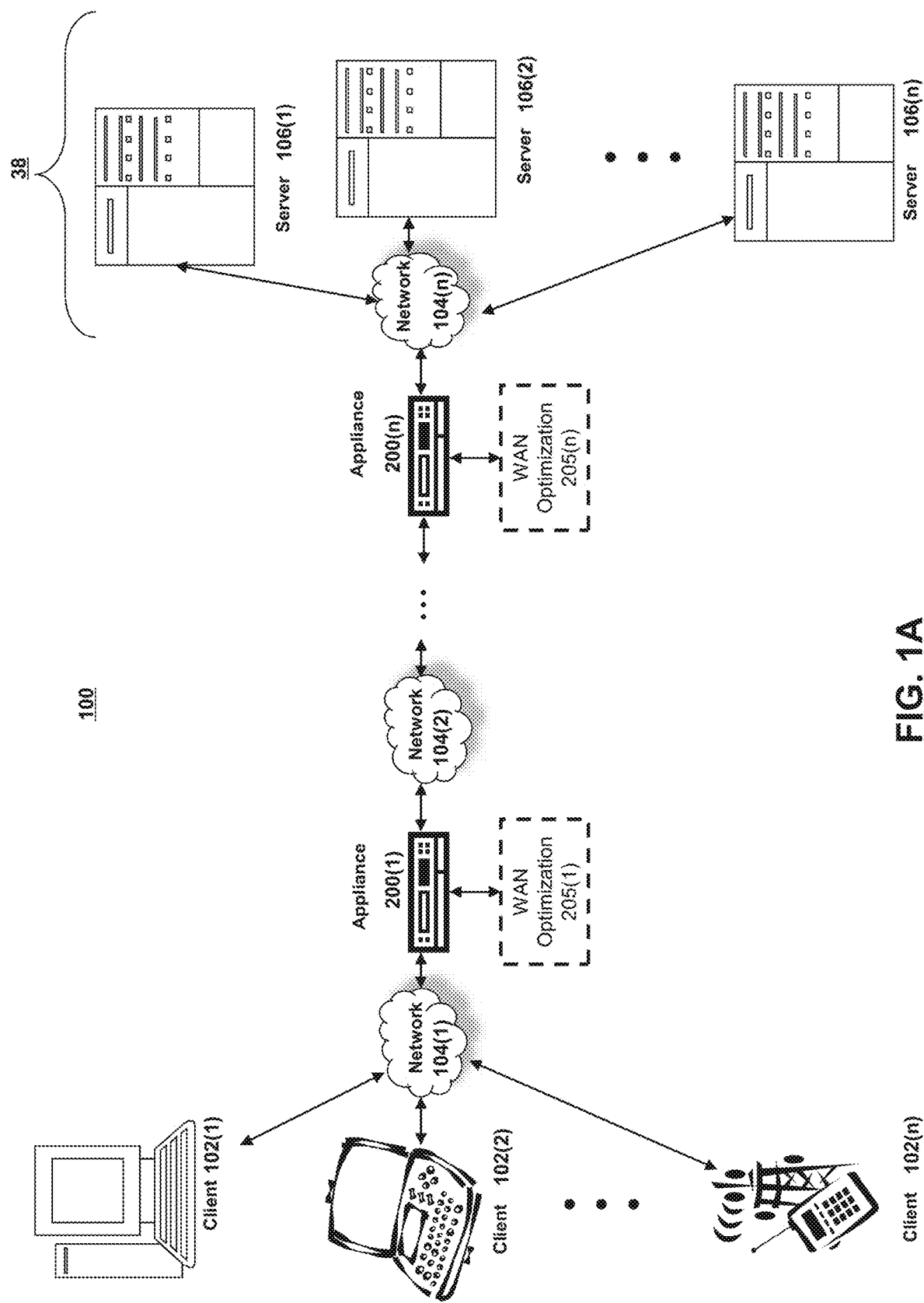
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and apparatuses for enhanced regulation of traffic.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
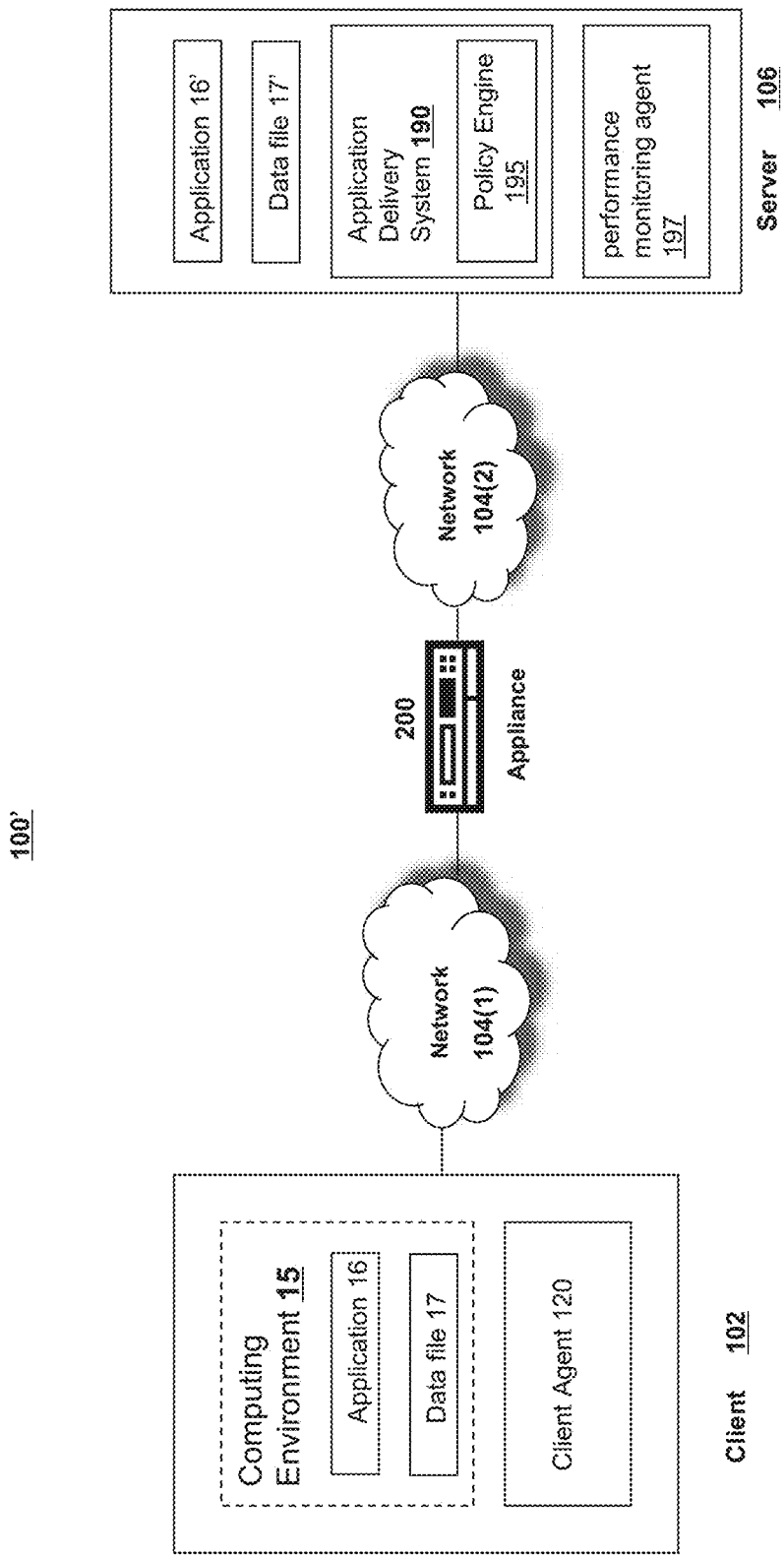
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
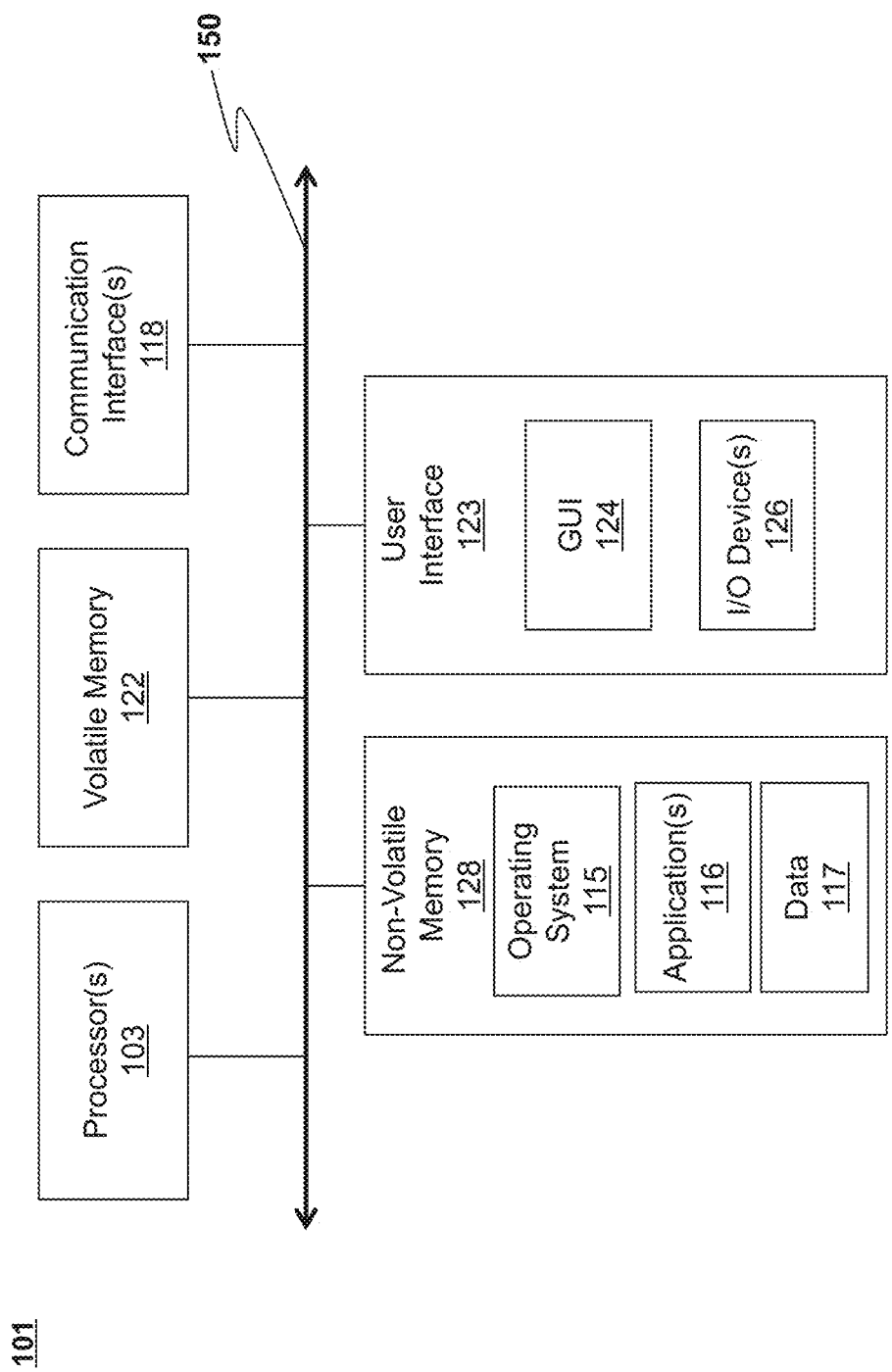
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
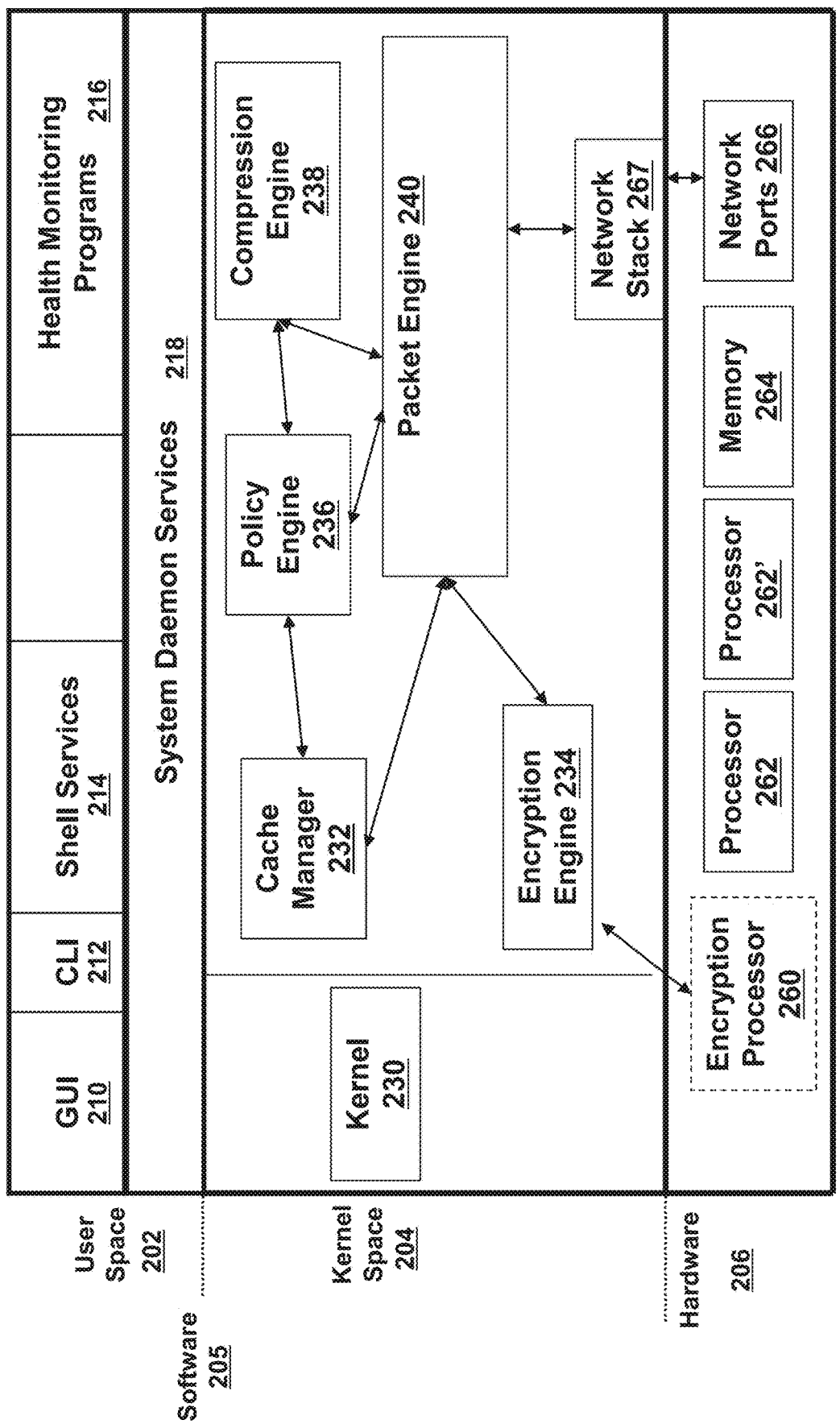
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
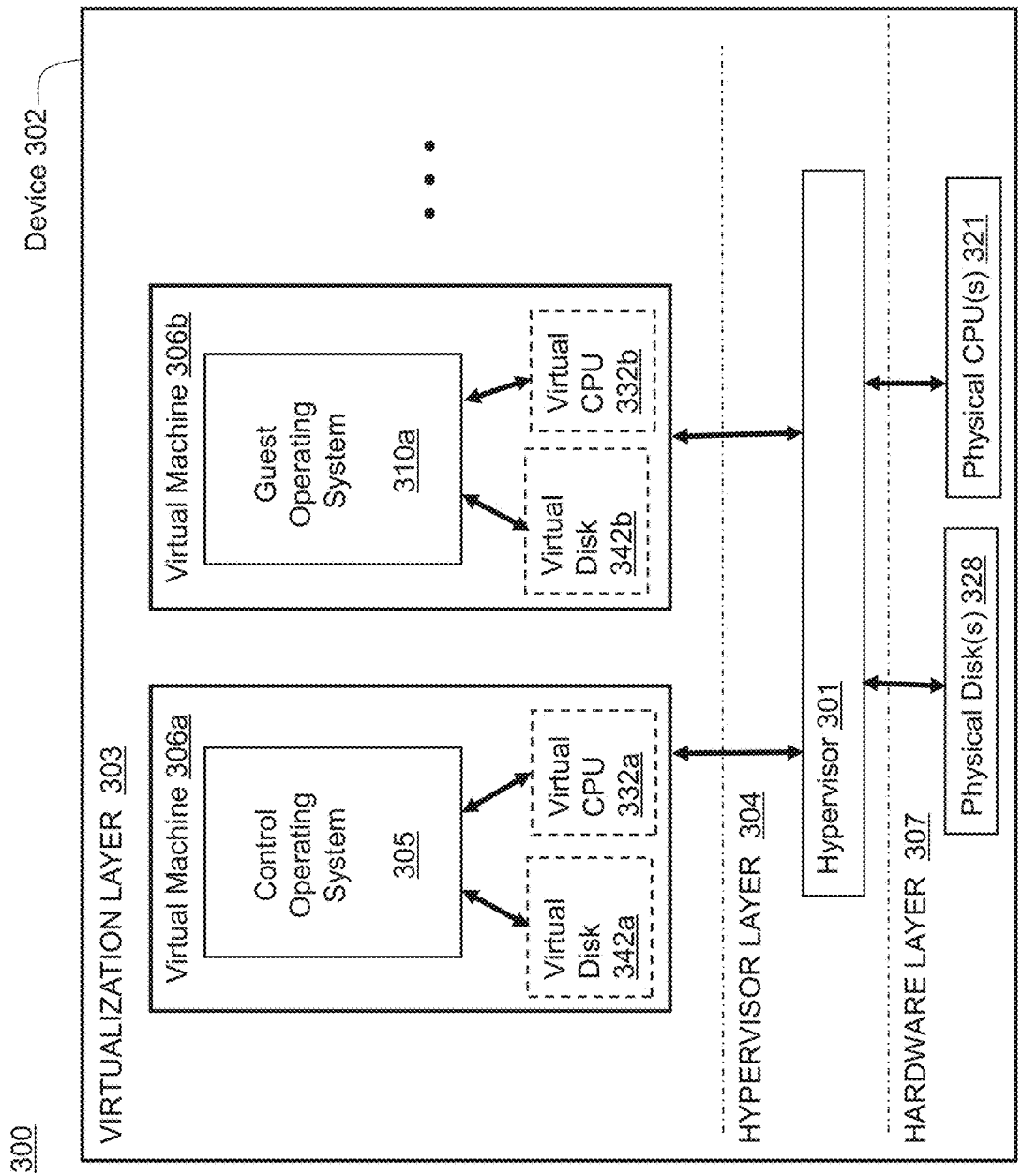
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
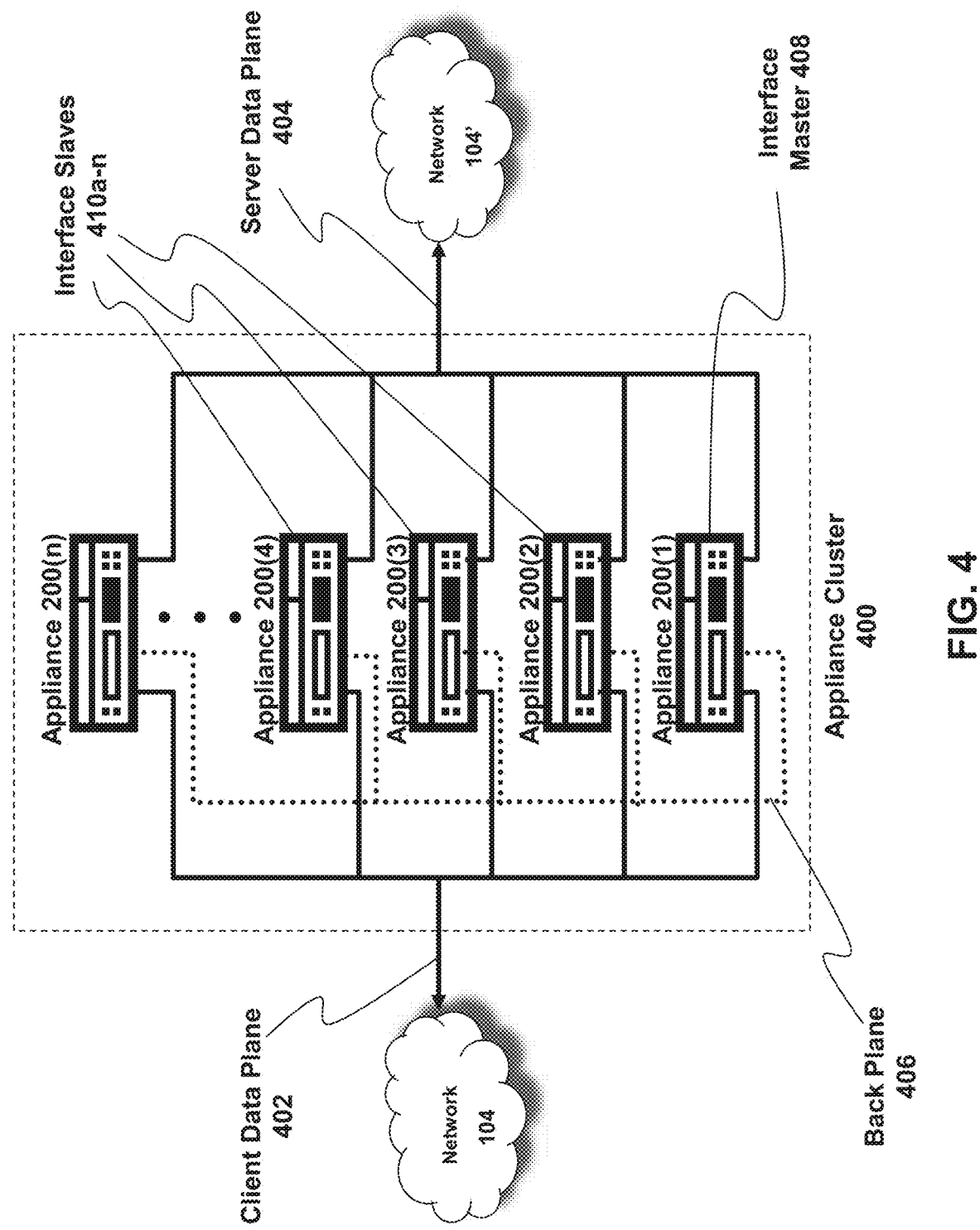
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similar to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

In some embodiments, the interface master 408 may comprise a flow distributor external to appliance cluster 400. In other embodiments, the interface master may comprise one of appliances 200(1)-200(n). For example, a first appliance 200(1) may serve as the interface master, receiving incoming traffic for the appliance cluster 400 and distributing the traffic across each of appliances 200(2)-200(n) (e.g., the interface slaves 410a-n). In some embodiments, return traffic may similarly flow from each of the interface slaves 410a-n via the first appliance 200(1) serving as the interface master 408.

The interface master 408 may perform load balancing or traffic flow distribution in any of a variety of ways. For example, in some embodiments, the interface master 408 may comprise a router performing equal-cost multi-path (ECMP) routing with next hops configured with appliances or nodes of the cluster. The interface master 408 may use an open-shortest path first (OSPF). In some embodiments, the interface master 408 may use a stateless hash-based mechanism for traffic distribution, such as hashes based on IP address or other packet information tuples. Hash keys and/or salt may be selected for even distribution across the nodes. In other embodiments, the interface master may perform flow distribution via link aggregation (LAG) protocols, or any other type and form of flow distribution, load balancing, and routing.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Apparatuses for Enhanced Regulation of Traffic

This disclosure is generally directed to systems and apparatuses for enhanced Quality of Service (QOS), steering, and/or policy enforcement for HTTPS traffic via intelligent in-line path discovery of Transport Layer Security (TLS) terminating node. Some network or intermediary devices may act as a proxy for another device and may, therefore, perform functions or actions on behalf of the other device. Network devices (also referred to as intermediary devices, middle boxes, appliances, etc.) which do not act as a proxy for a server or client device can lack the ability to decipher network traffic communicated over Transport Layer Security (TLS), or other secure connection. As more cloud-based network applications, including some high priority network applications, use a secure connection, such network devices cannot inspect data which is communicated through such network devices using the secure connection. These network devices may not be capable of inspecting data because they are not authorized to do so, they do not have the proper cryptographic information, etc.

In some embodiments, inspection of data may be helpful for performing traffic and policy regulation and network management for an enterprise and its branches. Where such traffic is encrypted, network devices which pass through the encrypted traffic and do not act as a proxy may not decrypt and interpret the traffic. Such network devices may lack cryptographic information, keys, secrets, which are needed for decrypting and interpreting the traffic. Hence, these network devices have or support limited Quality of Service (QoS) because they are limited in the functions which they are capable of performing in light of their inability to decrypt network traffic. Furthermore, for a network device to adopt policy enforcement and enterprise management frameworks, the network devices would have to intercept and decrypt the traffic, inspect the traffic, and/or take actions on the traffic in accordance with policies for users or applications at each branch of the enterprise. By deciphering traffic, Software-Developed Wide Area Networks (SDWAN or SD-WAN) devices may be used for developing central enterprise management frameworks, and network devices may intelligently decrypt traffic and perform intelligent application steering based on, for instance, uniform resource locator (URL) or other information in traffic. As such, the embodiments described herein can provide enhanced QoS of network devices by providing network devices the ability to understand and interpret traffic, and perform critical policy enforcement for all branches or datacenter of an enterprise, network or organization.

The embodiments described herein can provide seamless interception/inspection of Hypertext Transfer Protocol Secure (HTTPS) connections or other secure connections. The embodiments described herein can implement URL-based application steering. The embodiments described herein can provide a central framework for performing firewall actions and making security decisions on enterprise traffic. The embodiments described herein can provide enhanced QoS using an intelligent and adaptive application priority-based traffic management on encrypted connections. The embodiments described herein can provide a secure trusted zone between a server side network device and the HTTPS terminating node, thus ensuring a secure network connection for passing credentials from the HTTPS terminating node to another network device. Since, in some implementations, the network devices are not a proxy, the network devices may achieve desired aspects of encrypted traffic analysis and management while minimizing computational expenses.

Network devices may be or include SDWAN devices, which may be transparent intermediate network devices that overlay a Wide Area Network (WAN). SDWAN devices may perform many WAN optimizing functionalities and provide many value-added features. However, SDWAN devices typically lack the ability to fully participate in Session Description Protocol (SDP) operations since they cannot decipher data or traffic communicated across a secure connection. The embodiments described herein can provide a seamless method of providing the ability to participate in SDP capabilities. The SDWAN devices may be provided with key generation information for deciphering encrypted traffic communicated across a secure connection. Such embodiments can provide network devices the ability to participate in SDP operations and thereby apply filters, steer network traffic based on a URL, and the like.

In some implementations, the network devices can attempt intercepting network traffic without terminating the secure connections by using the server certificate and private-key decryption methods. However, such implementations may be limited to deciphering network traffic in a secure connection that uses Rivest-Shamir-Adleman (RSA) key exchange. However, such secure connections are not recommended for servers to enable because using RSA key exchange does not support perfect-forward-secrecy. The network device may not be permitted to decipher traffic with the server's certificate and private key where the traffic is across a secure connection which uses key exchange algorithms supporting perfect-forward-secrecy, such as Diffie-Hellman (DH), Elliptic-Curve DH (ECDH), etc. As modern applications and servers move away from RSA key-exchange in network connections handshake, network devices may fail to decipher the TLS traffic. Another approach is to terminate the secure connection on the network device with the same certificate and private key as the server. Such an approach can be computationally expensive and challenging as the network device acts as both server and client.

According to the embodiments described herein, a network device can decipher secure connection traffic without installing a server certificate and private key on the network device, and without terminating the secure connection at the network device, for instance. Such embodiments can maintain the secure connection beyond the network device and provides for the network device's participation in SDP. In particular, the network device may intercept, decrypt, and inspect traffic. The network device may then forward the original encrypted traffic or perform other traffic routing/filtering on the traffic.

A second network device (e.g., a Netscaler application delivery controller (ADC) device) on the server-side network may terminate a secure connection. A first network device (e.g., SDWAN device, at client device side or origin for instance) intermediary between the second network device and client device may determine that the second network device terminates the secure connection. The first network device may obtain key information from the second network device, and may intercept TLS sessions to apply for instance URL filters and perform URL based traffic steering.

The first network device may set TCP options to determine whether the secure connection is terminated by the second network device. In some embodiments, a third network device (also on the server-side network located between the first and second network device) such as a SDWAN device, may receive the TCP options from the first network device and pass those TCP options to the second network device. The third network device may wait for an acknowledgement message from the second network device. Where the second network device terminates the secure connection, the second network device may respond to the TCP options with TCP options indicating that the second network device terminates the secure connection. The third network device may receive an acknowledgement message from the second network device (which may or may not include the TCP options indicating the second network device terminates the secure connection). The third network device may establish a secure channel with the second network device. The third and/or first network device may buffer application data, while permitting exchange of data which may be used for performing a handshake and establishing the secure channel(s). The first network device may determine, based on the acknowledgement message received from the second network device via the third network device, that the second network device terminates the secure connection. The third network device may request key generation information (or other secrets, keys, etc.) from the second network device. Upon receipt of the key generation information from the second network device, the third network device may pass the key generation information to the first network device. The first network device may generate a cryptographic key using the key generation information. The first network device may inspect secure connection data, identify a URL for the data, for instance, and make network traffic regulation decisions.

Figure 5:
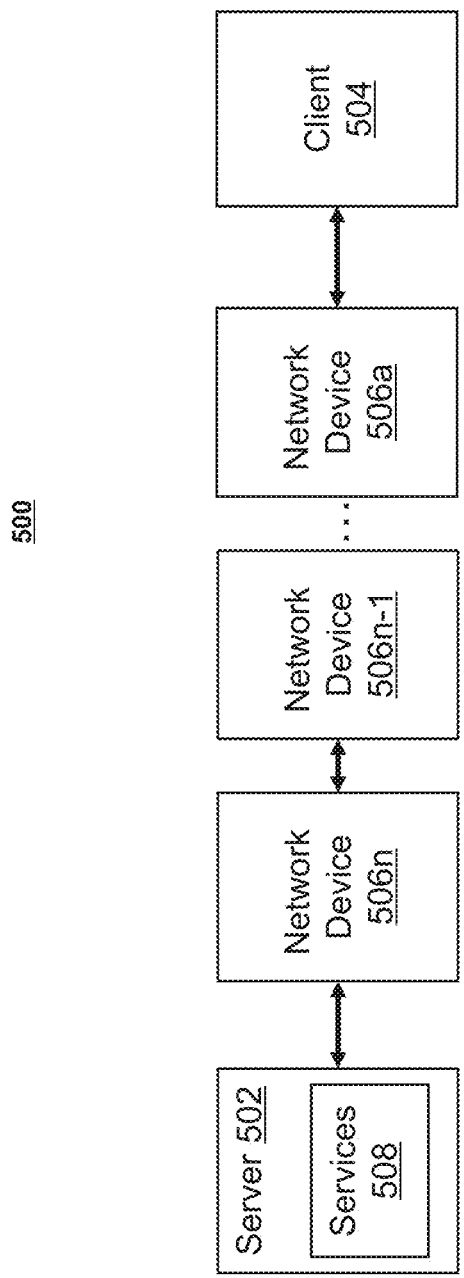
FIG. 5 is a block diagram of an embodiment of a system for enhanced regulation of traffic.

Referring now to FIG. 5, depicted is a system 500 for enhanced regulation of traffic. For instance, the system 500 can provide or support enhanced Quality of Service (QOS), steering, and policy enforcement for HTTPS traffic via intelligent in-line path discovery of Transport Layer Security (TLS) terminating node. The system 500 can include a server 502, a client device 504, and/or a plurality of network devices 506a-n arranged intermediate with the server 502 and the client device 504. A secure connection may traverse through the network devices 506a-n between the server 502 and client device 504 and be terminated at a second network device 506n. The secure connection may be an encrypted connection (e.g., that communicates encrypted packets, data or traffic) between two or more devices which provides for secure data exchange between the devices. For example, a secure connection can be a connection or channel that is secured in any way, such as using protocols such as secure socket layer (SSL), TLS or HTTPS. A first network device 506a (e.g., an SDWAN device) may determine that the second network device 506n (e.g., Netscaler ADC device) terminates the secure connection, which shall be described in further detail. The first network device 506a may receive key generation information from the second network device 506n responsive to determining that the second network device 506n terminates the secure connection. The first network device 506a may decipher packet(s) of the secure connection destined for the client device 504 or server 502 using the key generation information. The first network device 506 may decipher the packet(s) to regulate network traffic of the secure connection. Each of these devices, including the first and second network devices 506a, 506n, are discussed in further detail below.

The systems and methods of the present solution may be implemented in any type and form of device, including clients, servers and/or appliances 200 described above with reference to FIG. 1A-FIG. 1B, FIG. 2 and FIG. 4. As referenced herein, a "server" may sometimes refer to any device in a client-server relationship, e.g., an appliance 200 in a handshake with a client device 102. The server 502 may be an instance, implementation, or include aspects similar to server 106a-n described above with reference to at least FIG. 1A. Similarly, client device 504 may be an instance, implementation, or include aspects similar to client 102a-n described above with reference to FIG. 1A. The present systems and methods may be implemented in any intermediary device or gateway, such as any embodiments or aspects of the appliance or devices 200 described herein. Some portion of the present systems and methods may be implemented as part of a packet processing engine and/or virtual server of an appliance, for instance. The systems and methods may be implemented in any type and form of environment, including multi-core devices, appliances, gateways, network nodes, virtualized environments and/or clustered environments described herein.

The server 502 may host one or more services 508. The services 508 can include or correspond to any type or form of application or service. The application or service may include a network application, a web application, a Software-as-a-Service (SaaS) application, a remote-hosted application, and so on. As some non-limiting examples, an application can include a word processing, spreadsheet or other application from a suite of applications (e.g., Microsoft Office360, or Google docs), an application hosted and executing on a server for remote provisioning to a client, and/or a HTML5-based application. Packets corresponding to services 508 may be encrypted by the server 502 and delivered to the client device 504, and encrypted by the client device 504 and delivered to the server 502.

In some embodiments, the client device 504 may include or correspond to one of several client devices 504 residing for instance at a branch office and may operate within a client-side network, which may be a private network (e.g., a local area network (LAN) or wide area network (WAN)) between the client device(s) 504 and client-side network device(s) 506. In some embodiments, server 502 and client device 504 may be communicably coupled to one another via a secure connection (e.g., a LAN or a software-defined wide area network (SD-WAN)). The server 502 may reside at a server or data center, and may operate within a server-side network, which may also be a private network (e.g., a LAN, WAN, etc.). A network device 506*a*—n can include or correspond to any type or form of intermediary device, network device and/or middle box device, such as but not limited to a Netscaler device, SD-WAN device. Each (or at least some) of the server 502, client device 504, network device(s) 506 may be communicably coupled in series. In some embodiments, a secure connection may be established between the server 502 and client device 504 through the network device(s) 506*a-n*.

Figure 6:
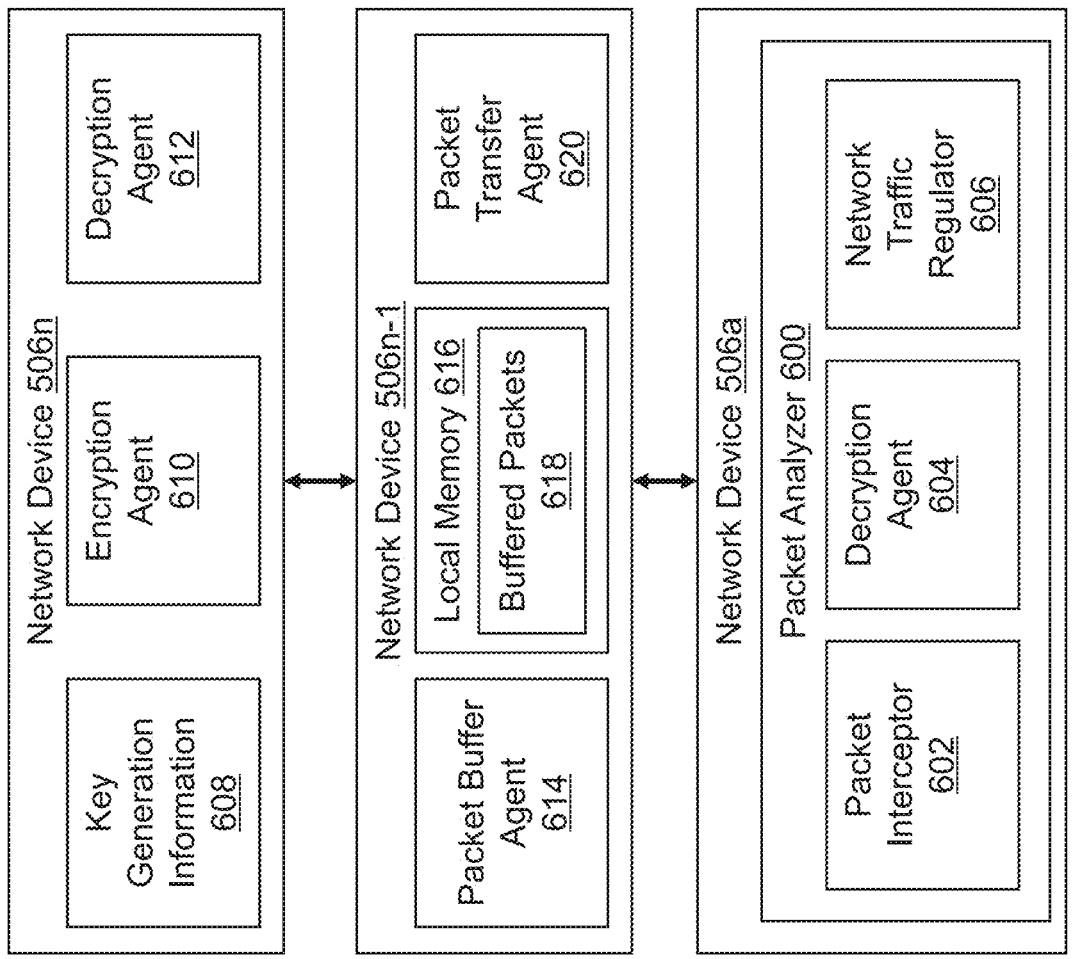
FIG. 6 is a block diagram of a first network device, second network device, and a third network device in the system of FIG. 5.

Referring to FIG. 6, depicted is a block diagram of a first network device 506*a*, second network device 506*n*, and a third network device 506*n*-1, according to an exemplary embodiment.

The first network device 506*a* is shown to include a packet analyzer 600 having a packet interceptor 602, a decryption agent 604, and a network traffic regulator 606. Each of the packet interceptor 602, the decryption agent 604, and the network traffic regulator 606 shall be described in further detail below. Generally speaking, the packet interceptor 602 may be designed or implemented to intercept packets destined to the client device 504 and/or server 502. The decryption agent 604 may be designed or implemented to decode the intercepted packets. The network traffic regulator 606 may be configured to regulate network traffic of the secure connection. Each of these components may be embodied as a portion of a circuit, such as a processing circuit. For instance, these components may be embodied as computer readable instructions stored on non-transitory memory which cause a processor to perform various functions. Further, some of these components may be combined to form a single component.

The second network device 506*n* is shown to include key generation information 608, an encryption agent 610, and a decryption agent 612 (which may be similar in some respects to or different from the decryption agent 604 of the packet analyzer 600). Each of the key generation information 608, encryption agent 610, and decryption agent 612 shall be described in further detail below. Generally speaking, the key generation information 608 may be used for encrypting and decrypting network traffic (e.g., packets) for transmission via the secure connection. The second network device 506*n* may include an encryption agent 610 for encrypting packets using the key generation information 608, and a decryption agent 612 for decrypting packets using the key generation information 608.

The third network device 506*n*-1 may be intermediate the first and second network devices 506*a*, 506*n*. The third network device 506*n*-1 may include a packet buffer agent 614 for buffering packets delivered across the secure connection. The packet buffer agent 614 may temporarily buffer packets (e.g., in local memory 616 as buffered packets 618) until the key generation information 608 is passed from the second network device 506*n* (through the third network device 506*n*-1) to the first network device 506*a*. The third network device 506*n*-1 is shown as including a packet transfer agent 620. The packet transfer agent 620 may be configured to facilitate exchanging of specific packets between the first and second network devices 506*a*, 506*n*. Each of the packet buffer agent 614, local memory 616 including buffered packets 618, and packet transfer agent 620 are discussed in further detail below.

While some of these capabilities are shown as embodied on the third network device 506*n*-1, in some embodiments, the first network device 506*a* may similarly include packet inspection, buffer, and transfer capabilities. For example, the first network device 506*a* and third network device 506*n*-1 may both include a packet buffer agent 614 and packet transfer agent 620. As such, the first and third network devices 506*a*, 506*n* may be configured to selectively buffer and transmit network traffic, e.g., depending on the direction of traffic flow and packet header. For instance, the first network device 506*a* may be configured to selectively buffer traffic flowing from the client device 504 in a direction towards the server 502, and the third network device 506*n*-1 may be configured to selectively buffer traffic flowing from the server 502 in a direction towards to the client device 504.

Each packet delivered across the secure connection (and communicated or otherwise exchanged through the network) may include header information and a payload. The header information and the payload of each packet may be generated in accordance with any number of communication protocols at any network stack layer, such as: an Application Layer protocol (e.g., HyperText Transfer Protocol (HTTP), Common Internet File System (CIFS), Messaging Application Programming Interface (MAPI)), a Transport Layer protocol (e.g., Transmission Control Protocol (TCP) and User Datagram Protocol (UDP)), and a Network Layer protocol (e.g., Internet Protocol (IP), Internet Protocol Security (IPsec), and Datagram Delivery Protocol (DDP)), among others. The network stack layer can include any of the layers in the Open Systems Interconnection (OSI) model or the Internet protocol suite.

The header information of the packet may be generated in accordance with any number of communication protocols at any network stack layer. In some embodiments, the header information for a packet generated in accordance with a Transport Layer (or layer 4 or L4 according to the OSI model) protocol may include Transport Layer header information. In some embodiments, the header information for a packet generated in accordance with a Network Layer (or layer 3 or L3) protocol may include Network Layer header information. In some embodiments, the header information for a packet generated in accordance with an Application Layer protocol may include Application Layer header information. In general, the header information of the packet may include a source address, a source port, a destination address, a destination port, a session identifier, a protocol number, one or more options, a checksum, and/or other data typically included in packet headers, among others. The source address or source port may correspond to the client device 504 or server 502. The destination address or destination port may correspond to the client device 504 or server 502. The header information 545 may also include one or more header fields (e.g., of HTTP protocol) as specified by the communication protocol.

The header information of the packet may also include metadata. In some embodiments, the metadata of the header information of the packet may be associated with the application or service 508 running on the client device 504. The metadata may include, for example, an indicator specifying that the packet is application-specific, an account identifier for the client device 504 (e.g., a user profile, email address, or screen name), a service identifier (e.g., a name of the service 508), a profile of the service 508 (e.g., version number of the service 508), information about the client device 504 or a user, and/or a timestamp corresponding to generation of the packet, among others. The metadata may be used for identifying, for instance, the source of the packet, the destination of the packet, what type of service 508 is generating or providing the packet, etc. This information may be used for application of policies, traffic routing decisions, among other purposes.

The payload of the packet may include data generated by the client device 504, the server 502, or one of the network devices 506 itself. In some embodiments, the payload of the packet received from the service 508 running on the client device 504 may include a request to access resources hosted on the server 502 for the service 508 (e.g., a function call). In some embodiments, the data of the payload (or data of the packet) may be unencrypted by the application running on the client device 504. In some embodiments, the data of the payload may be encrypted by the application running on the client device 504. The application or service running on the client device 504 may apply any number of cryptographic algorithms, operations and/or functions to, for instance, the payload of the packet to send to the server 502. In some embodiments, the payload of the packet received from the server 502 may include data from the resources hosted at the server 502 for the application (e.g., return to the function call) running on the client device 504. In some embodiments, the data of the payload may be unencrypted by the server 502. In some embodiments, the data of the payload may be encrypted by the server 502 (e.g., under TLS or secure socket layer (SSL) protocol). In response to receipt of a request from the client device 504 through the network, the server 502 may apply any number of cryptographic algorithms for encrypting, at least, the payload of the packet to send to the client device 504. In some embodiments, the network device(s) 506 may apply the cryptographic algorithms, operations, and/or functions onto the header information and/or payload of the packet.

The first network device 506a may be arranged at or otherwise communicably coupled to the client-side network. Accordingly, the first network device 506a may be communicably coupled to the client device 504 (and other client devices 504 residing or otherwise connected to the client-side network) as shown in FIG. 5. The second network device 506n may be arranged or otherwise communicably coupled to the server-side network. Accordingly, the second network device 506n may be communicably coupled to the server 502 as shown in FIG. 5.

The second network device 506n may be designed or implemented to terminate one end of the secure connection. In this regard, the secure connection may be terminated at one end at the second network device 506n rather than the server 502. The second network device 506n may be configured to decipher, decrypt, or otherwise decode packets delivered from the client device(s) 504 to the server 502 (e.g., using the decryption agent 612). Hence, decoding of packets may be performed by a device other than the server 502 (e.g., the second network device 506n using the decryption agent 612). Such embodiments may speed up or offload the server 502 by permitting the server 502 to allocate processing and computing resources to different tasks other than decoding/decrypting received packets. Similarly, the second network device 506n may encrypt packets received from the server 502 to be delivered to, for instance, one of the client devices.

The second network device 506n may be configured to perform cryptographic operations, e.g., decrypt and encrypt the packets, using key generation information 608 (e.g., cryptographic secrets, parameters and/or configurations), the encryption agent 610, and decryption agent 612. In some embodiments, the key generation information 608 may be stored locally (e.g., on the second network device 506n). In some embodiments, the key generation information 608 may be stored on a different device which is remotely accessible by the second network device 506n. The key generation information 608 may be pre-stored or pre-loaded on the second network device 506n, or the key generation information 608 may be sent, communicated, loaded, or otherwise provided to the second network device 506n (by a network administrator, for instance). The key generation information 608 may include, specify and/or relate to, for instance, an algorithm or protocol for generating a cryptographic key which is used by the encryption and decryption agents 610, 612 for encrypting or decrypting data, respectively.

The key generation information 608 may correspond or relate to, or include a cryptographic algorithm or information pertaining to a cryptographic context. The cryptographic context may be or include any information regarding a cryptographic arrangement, configuration and/or algorithm (e.g., cryptographic protocol, procedure, process, construct, formulation, key(s), credentials and/or secret(s)) which is/are to be used for encrypting and decrypting network traffic. The cryptographic algorithm may incorporate or include: symmetric-key algorithms, such as block ciphers (e.g., Advance Encryption Standard (AES) of 128 bits or 256 bits, Rivest Cipher-5 (RC5) of 64 bits or 128 bits, or Blowfish cipher), stream ciphers (e.g., A5/1, A5/2, HC-256, or Rivest Cipher-4 (RC4) or 1684 or 2064 bits), or others (e.g., Kerberos protocol); asymmetric-key algorithms (e.g., Digital Signature Algorithm, Elliptic Curve algorithm, Rivest-Shamir-Adleman (RSA), and Diffie-Hellman key exchange protocol); and cryptographic hash functions (e.g., hash-based message authentication code (HMAC), message-digest algorithm (MD5), and Secure Hash Algorithm (SHA-1, SHA-2, and SHA-3)). The second network device 506n may be configured to generate one or more cryptographic keys (and/or perform cryptographic operation(s)) using the key generation information 608. The cryptographic key(s) may be used by the encryption and decryption agents 610, 612 for encrypting and/or decrypting packets delivered across the secure connection.

In some embodiments, the second network device 506n may be configured to share the key generation information 608 with the first and/or third network device 506a, 506n-1, as described in greater detail below. In some instances, the second network device 506n may be configured to share the key generation information 608, the cryptographic key generated using the key generation information, etc. The key generation information 608 (and/or cryptographic key(s)) may be shared with (e.g., either directly or indirectly through the third network device 506n-1) the first network device 506a to permit the first network device 506a to decipher network traffic (e.g., packets). The first network device 506a may decipher network traffic to regulate the network traffic.

The first network device 506a may be designed or configured to determine that the second network device 506n terminates the secure connection. The first network device 506a may be configured to determine that the second network device 506n is to terminate the secure connection (or not), during the handshake process between the client device 504 and the server 502 (or the second network device 506n, such as on behalf of the server 520, in some embodiments) for forming the secure connection. The first network device 506a and second network device 506n may be configured to exchange TCP options during the handshaking. The first network 506a and second network device 506n may exchange (or pass) handshaking information as a part of an automated process for establishing, for instance, the protocols of the secure connection. The client device 504 and server 502 (or second network device 506n) may be configured to begin the handshaking protocol prior to (and/or while) exchanging network traffic. The handshaking information may include, for instance, secure connection settings, authentication or validation information, etc. In some embodiments, the secure connection may be a TLS connection, which may operate on top of TCP. The client device 504 and server 502 may be configured to perform handshaking to establish trust with one another. The client device 504 and server 502 may be configured to perform handshaking in a number of ways. The client device 504 and server 502 may be configured to perform handshaking by using public/private keys, pre-shared keys, unique parameters, etc. In each of these embodiments, the handshake information may be (at least partially) unencrypted or decrypted, e.g., in the header portion of corresponding packets. The first network device 506a and second network device 506n may be configured to intercept the handshake information to set or update TCP options, as described in greater detail below.

The client device 504 and server 502 (or second network device, such as a Netscaler ADC device) may be designed or implemented perform handshaking based on ownership of a public key. In some embodiments, the server 502 (or second network device 506n) may distribute, disseminate, disburse, provide, generate or otherwise output public keys. The public keys may be disseminated widely. Hence, any entity, computing device, etc., which possesses the public key may encrypt a message or data using the public key. The client device 504 may receive the public key. The client device 504 may be configured to deliver an encrypted message or data to the server 502 (or second network device 506n). The message may be encrypted using the public key from the second network device 506n. The server 502 may maintain a private key which is used for decrypting messages. Upon receipt of an encrypted message from the client device 504 (e.g., within metadata accompanying a packet, within the header of a packet, etc.), the server 502 (or second network device 506n) may be configured to decrypt the message using the private key. The server 502 (or second network device 506n) and client device 504 may communicate via the secure connection through contents of the decrypted message (e.g., successful decryption using the private key corresponding to the public key), based on the client device 504 using the public key to encrypt the message, etc.

The client device 504 and server 502 (or second network device 506n) may be designed or implemented to perform handshaking based on ownership of a pre-shared key (PSK). Prior to exchanging any packets between the client device 504 and server 502 (or second network device 506n), the server 502 (or second network device 506n) may be configured to communicate a pre-shared key to the client device 504. The pre-shared key may include or correspond to a string of characters or dataset which may be used as a validation key. The client device 504 and server 502 (or second network device 506n) may be configured to generate and exchange hash values based on the pre-shared keys. Following exchanging of the hash values (e.g., within metadata accompanying a packet, within the header of a packet, etc.), the client device 504 and server 502 (or second network device 506n) may perform and execute a handshaking to establish trust.

The client device 504 and server 502 (or second network device 506n) may be designed or implemented perform handshaking based on a parameter uniquely associated with the client device 504. The server 502 (or second network device 506n) may be configured to deliver, communicate, or otherwise provide the parameter (e.g., a unique identifier, a pin, a token, etc.) to the client device 504. The server 502 (or second network device 506n) may provide the parameter to the client device 504 at enrollment (e.g., when the client device 504 registered with the server 502 (or second network device 506n), for instance). The server 502 (or second network device 506n) may be configured to maintain a list or database of parameters and their corresponding client devices 502. The client device 504 may be configured to deliver information corresponding to the parameter (e.g., the parameter itself, a hash value associated with the parameter, etc.) to the server 502 (or second network device 506n). The client device 504 may deliver the information corresponding to the parameter to the server 502 (or second network device 506n) within metadata accompanying a packet, within the header of a packet, etc. The server 502 (or second network device 506n) may cross-reference the information corresponding to the parameter with stored information (e.g., the list of parameters and client device(s) 502 maintained by the server 502 (or second network device 506n)).

The first network device 506a may be configured to set a TCP option in a packet (e.g., TLS handshake packet from client device 504, or other packet destined for the server 502) which is communicated via the first network device 506a to the second network device 506n. The TCP option may for instance be set as a predetermined flag (e.g., bit or byte) in an options field of the header section of the packet. During the handshake process to establish the new TLS connection, the packet may not be encrypted for instance, and can be transmitted to the server 502 (or network device 506) via the first network device 506a. Hence, the first network device 506a can intercept the packet and set or update one or more TCP options in the packet. The TCP option may include a flag or instruction to request information pertaining to the secure connection. For instance, the setting for the TCP option may include (or cause) a request for information regarding whether the second network device 506n terminates the secure connection.

The second network device 506n (e.g., Netscaler ADC device) may be configured to receive the packet (e.g., a TCP SYN, or synchronization message or request, to start a TCP connection) including the TCP option from the first network device 506a. The second network device 506n may be configured to identify the TCP option within the packet. In some embodiments, upon receipt, the second network device 506n may be configured to automatically respond (e.g., in an acknowledgement message, such as a TCP SYN-ACK packet) using settings for TCP options indicating whether the second network device 506n terminates the secure connection. In some embodiments, upon receipt, the second network device 506 may be configured to respond using settings for TCP options when the second network device 506n terminates the secure connection. In other words, the second network device 506n may be configured to respond if the second network device 506n terminates the secure connection, and not respond if the second network device 506n does not terminates the secure connection (e.g., when the connection merely passes through the second network device 506n). The response (e.g., TCP SYN-ACK packet) itself (e.g., with or without TCP option(s)) and/or a TCP option setting in the response can include or correspond to an indication that the second network device 506n terminates one end of the secure connection. In some embodiments, the second network device 506n may be configured to respond only when the second network device 506n and first network device 506a are managed, configured and/or owned by the same entity (e.g., organization or administrator), are a part of a compatible group of devices (e.g., manufactured by the same entity, or designed to work together), and/or are otherwise compatible in some manner. In one or more of these embodiments, the second network device 506n may be configured to respond to the request from the first network device 506a. While described as using TCP options set in a packet, in some embodiments, the first network device 506a and second network device 506n may be configured to exchange other prompts, packets, or other notifications which requests and/or replies to provide information pertaining to the secure connection for spanning and connecting the first and second network devices 506a, 506n.

The first network device 506a may be configured to request and/or obtain key generation information 608 from the second network device 506n via the third network device 506n-1, for instance. The third network device 506n-1 may request and/or obtain the key generation information 608 from the second network device 506n, as will be discussed further below, and can share this with the first network device 506a. In some embodiments, the first network device 506a may be configured to obtain, receive and/or request the key generation information 608 (e.g., similar to the third network device 506n-1, as will be discussed further below) responsive to determining that the second network device 506n terminates the secure connection. The key generation information 608 may include or correspond to information which is used for generating, creating, or otherwise forming a cryptographic key. The key generation information 608 can include a connection secret, a session secret, a master secret, cipher codes, key codes, key/cipher bits, etc. In some embodiments, the key generation information 608 may include secret bytes for a secure connection (such as a master secret for TLS protocols up to TLSv1.2, or other relevant secrets in instances where the secure connection includes TLSv1.3).

The first network device 506a may be configured to communicate the request for the key generation information 608 in a packet to the second network device 506n. The second network device 506n may be configured to communicate the key generation information 608 to the first network device 506a upon receiving the request from the first network device 506a. The second network device 506n may be configured to communicate the key generation information 608 in connection with a handshaking process between the first and second network device 506a, 506n. Such embodiments may ensure security of the key generation information 608 to prevent inadvertent disclosure or malicious interception of the key generation information 608. As such, the second network device 506n may be configured to communicate the key generation information 608 only to trusted network devices (such as the first network device 506a), which may be identified as network devices managed, administered and/or owned by the same entity, that are manufactured by the same entity, designed to work together, or otherwise are compatible with one another.

The first network device 506a may be configured to construct, build, assemble, or otherwise generate cryptographic key(s) using the key generation information 608 received from the second network device 506n. The first network device 506a may be configured to generate the cryptographic key using a cryptographic protocol or algorithm specified in the key generation information 608. As described above, the second network device 506n may be configured to use the key generation information 608 to generate a cryptographic key. The first network device 506a may similarly be configured to use the key generation information 608 from the second network device 506n to generate a cryptographic key. In other words, the cryptographic key generated by the first network device 506a may be similar or compatible in at least some aspects to the cryptographic key generated by the second network device 506n. Hence, the first network device 506a may be configured to decipher, decrypt, decode, or otherwise interpret network traffic which is encrypted (e.g., by the second network device 506n) based on or using the cryptographic key and/or the key generation information. In some embodiments, the third network device 506n-1 may be configured to use the key generation information. For instance, when the third network device 506n-1 receives the key generation information from the second network device 506n, the third network device 506n-1 may be configured to pass a copy of the key generation information 608 to the first network device 506a, and maintain a copy of the key generation information 608. The third network device 506n-1 may be configured to perform network traffic regulation (similar to network traffic regulation performed by the first network device 506a described below) by inspecting network traffic packets using the key generation information 608 and/or cryptographic key.

The first network device 506a (and/or the third network device 506n-1) may be configured to decipher (e.g., decrypt, unencrypt, decode) one or more packets of the secure connection destined for the client device 504 or server 502 using the key generation information 608 (e.g., the cryptographic key generated using the key generation information 608). The first network device 506a may be configured to intercept packets destined for the client device 504 and/or server 502. The first network device 506a may include a packet interceptor 602. The packet interceptor 602 may be a device, component, or group of devices or components designed or implemented to reroute, capture, receive, hold, divert, or otherwise intercept packets from the secure connection through the first network device 506a. The packet interceptor 602 may be configured to intercept the packets prior to the packets being delivered to their destination. Hence, the packet interceptor 602 may be configured to at least temporarily prevent delivery of packets to their intended destination (e.g., the client device 504, the server 502, or another device).

The first network device 506a may be designed or implemented to decipher the intercepted packets (e.g., intercepted by the packet interceptor 602). The first network device 506a may include a decryption agent 604. The decryption agent 604 may correspond to or include any device, component, or group of devices/components configured to decrypt, decode, interpret, or otherwise decipher the one or more packets intercepted by the packet interceptor 602. The decryption agent 604 may be configured to decipher the packet(s) using the key generation information 608 from the second network device 506n. The decryption agent 604 may be configured to decipher the packets which are destined for the client device 504 or server 502 using the cryptographic key generated by the first network device 506a with the key generation information 608 from the second network device 506n.

The first network device 506a may be configured to regulate network traffic of the secure connection based on data obtained, derived, inferred and/or extracted from the packets. The first network device 506a may include a network traffic regulator 606. The network traffic regulator 606 may include or correspond to any device, component, or group of devices/components designed or implemented to manage, control, coordinate and/or regulate network traffic based on various information in packets for the network traffic and/or policies as applied to the network traffic. The network traffic regulator 606 may be configured to analyze packets deciphered by the decryption agent 604. The network traffic regulator 606 may be configured to identify various information contained in the deciphered packets. For instance, the network traffic regulator 606 may be configured to identify information in the payload for the packets. The network traffic regulator 606 may be configured to identify a URL for (e.g., specified in) the packets. The network traffic regulator 606 may be configured to identify a source and destination for the packets. The network traffic regulator 606 may be configured to regulate network traffic of the secure connection based on such identified information in the network traffic (e.g., the packets).

In some embodiments, the network traffic regulator 606 may be configured to perform packet filtering, acceleration and/or routing (or other traffic regulation or optimization operation) based on the deciphered packets. The network traffic regulator 606 may be designed or implemented to regulate or manage packets delivery to specific client devices 504 based on information contained in the packets (e.g., as deciphered by the decryption agent 604). The network traffic regulator 606 may be configured to identify a destination of the packet based on information within the deciphered packet. The network traffic regulator 606 may be configured to route, re-route, prioritize and/or process the packet for sending to the client device 504 associated with the identified destination. In this regard, the network traffic regulator 606 may be configured to perform network traffic regulation or management rather than other client-side devices, which may increase efficiency of network traffic processing and expedite delivery of network traffic to the proper client devices 504.

The network traffic regulator 606 may be configured to apply one or more policies to the deciphered packets. The network traffic regulator 606 may be configured to access one or more policies. The policies may be stored locally (e.g., on the first network device 506a), remotely (e.g., on any device within the network) and accessible by the first network device 506a, etc. The policies can be accessed, retrieved, selected, applied and/or otherwise used by the network traffic regulator 606 for determining, identifying, executing, or otherwise performing traffic routing and/or regulation decisions based on information contained in the packets. For example, the network traffic regulator 606 can apply the one or more policies on metadata or header information for a packet intercepted by the packet interceptor 602 and deciphered by the decryption agent 604. The policies may indicate that certain types of information are not to be delivered to certain client devices 504. For instance, where a low-level employee requests on their client device confidential or secure information from a service 508 to which they do not have access and the service 508 attempts to deliver such information in a packet, the network traffic regulator 606 may be configured to apply policies to the packet and determine that the client device 504 is not authorized to access that information. The network traffic regulator 606 may be configured to re-route the packet to a different client device 504 (e.g., a client device 504 associated with a cyber-security officer, higher-level employee, an IT administrator, etc.). In some embodiments, the network traffic regulator 606 may be configured to block and/or purge the packet responsive to determining the client device 504 cannot access the packet (e.g., rather than re-routing the packet).

In some embodiments, the policies may indicate that particular information contained in a packet is not to be delivered to a server 502, or can be delayed or re-prioritized. For instance, a client device 504 may attempt delivery of low-priority, secure or confidential information outside of an enterprise to a third-party server 502. The first network device 506a may be configured to intercept the packet containing the low-priority/secure/confidential information via the packet interceptor 602. The first network device 506a may be configured to decipher the packet via the decryption agent 604 using the key generation information 608 and re-route/purge/delay/re-prioritize the packet using the network traffic regulator 606 based on application of the policies.

In some embodiments, a third network device 506n-1 may be installed, situated, arranged, or otherwise located intermediary between the first network device 506a and second network device 506n. The secure connection may traverse, run, tunnel or otherwise pass through third network device 506n-1 and first network device 506a, and terminate at the second network device 506n. The third network device 506n-1 may be located within the server-side network downstream from the second network device 506n. The third network device 506n-1 may be configured to establish a secure channel between the third network device 506n-1 and the second network device 506n. The secure channel may be similar to the secure connection described above. In some embodiments, the secure channel may be a limited communications link (e.g., sufficient to establish a secured communication and/or trust between the third network device 506n-1 and the second network device 506n). The secure channel may be similar to a secure connection, which may be or include an HTTPS connection, a TLS connection, or an SSL connection. The secure channel may be used for exchanging communications between the second and third network devices 506n, 506n-1.

In some embodiments, the third network device 506n-1 may be configured to send, communicate, convey or otherwise exchange handshake data between the client device 504 or first network device 506a, and the second network device 506n (or server 502). The third network device 506n-1 may include a packet buffer agent 614 and packet transfer agent 620. The packet buffer agent 614 may be configured to buffer packets which are to be exchanged between the server 502 and client device 504. The packet buffer agent 614 may include, for instance, local memory 616 or cache (which may be temporary memory, such as RAM), which the packet buffer agent 614 stores buffered packets 618. The packets may be buffered temporarily until they are permitted to be released (or until they can be purged). In some embodiments, the third network device 506n-1 may be configured to buffer all or certain packets which are exchanged across the secure connection and passing through the third network device 506n-1. In some embodiments, the third network device 506n-1 may be configured to release or transmit some packets, such as those containing handshake information or data. The third network device 506n-1 may be configured to identify handshake data in packets exchanged between the first and second network device 506a, 506n. The third network device 506n-1 may be configured to detect, recognize or identify handshake data based on the type of packet, e.g., according to information contained in the header for the packets, the absence of data encryption, size or absence of payload, the communications protocol of the packets, etc. For example, and in some embodiments, the header of the packet may include a tag which indicates which type of data is included in the payload. The tag may indicate that the payload includes handshake data. The third network device 506n-1 may be configured to identify the handshake data based on the tag. The packet transfer agent 620 may be configured to pass, communicate, release, transmit or otherwise transfer packets containing handshake data. The packet transfer agent 620 may be configured to transfer packets containing the handshake data to the intended destination (e.g., the first network device 506a or second network device 506n).

While shown as embodied on the third network device 506n-1, in some embodiments, the first network device 506a may similarly include packet inspection, buffer, and transfer capabilities. For example, the first network device 506a and third network device 506n-1 may both include a packet buffer agent 614 and packet transfer agent 620. As such, the first and third network devices 506a, 506n may be configured to selectively buffer and/or transmit network traffic depending on the direction of traffic flow and/or contents of a packet header. For instance, the first network device 506a may be configured to selectively buffer traffic flowing from the client device 504 to the server 502, and the third network device 506n-1 may be configured to selectively buffer traffic flowing from the server 502 to the client device 504.

The third network device 506n-1 may be configured to request the key generation information (e.g., to share with the first network device 506a) from the second network device 506n. In some embodiments, the third network device 506n-1 may be configured to generate and send a request for the key generation information. In certain embodiments, the third network device 506n-1 may be configured to receive a request for the key generation information from the first network device 506a. The third network device 506n-1 may be configured to pass the request for the key generation information from the first network device 506a to the second network device 506n. The third network device 506n-1 may be configured to await acknowledgement of receipt of the request for key generation information from the second network device 506n. The third network device 506n-1 (and/or the first network device 506a) may be configured to buffer certain packets (e.g., non-handshake packets) to be communicated across the secure connection, until acknowledgement and/or key generation information is received by the third network device 506n-1 from the second network device 506n or a timeout event occurs. The timeout event may be an expiration of the handshake between the client device 504 or the third network device 506n-1, and the second network device 506n. The timeout event or expiration may be triggered based on a threshold time duration (e.g., predetermined according to the communications or handshake protocol, or according to an established service level agreement) for receiving a response or completing the handshake. The timeout event may be a timeout of the secure connection. In response to the timeout event, the third network device 506n-1 (and/or first client device 506a) may be configured to release the packets from the local memory 616 (e.g., to inspect and/or send the buffered packets 618), or purge the buffered packets 618, etc.

The third network device 506n-1 may be configured to receive the key generation information 608 from the second network device 506n. The third network device 506n-1 may receive the key generation information 608 from the second network device 506n with the acknowledgement message (e.g., SYN-ACK packet), following sending and receipt of the acknowledgement message, etc. The third network device 506n-1 may be configured to receive the key generation information 608 from the second network device 506n across the secure channel described above and extending between the second and third network devices 506n, 506n-1. The third network device 506n-1 may be configured to pass the key generation information 608 to the first network device 506a, e.g., for generation of the cryptographic key. In some embodiments, the third network device 506n-1 may be configured to generate a cryptographic key using the key generation information (prior to, after and/or while passing the key generation information 608 to the first network device 506a, for instance). In these embodiments, the third network device 506n-1 may similarly be configured to decrypt, decipher, inspect and/or regulate network traffic for the secure connection.

The third network device 506n-1 may be configured to receive (and, the first network device 506a may be configured to send) acknowledgement of receipt of the key generation information 608. In some embodiments, the third network device 506n-1 may be configured to release, communicate, transfer, or otherwise send the buffered packets 618 (e.g., stored in local memory 616) to the first network device 506a following receipt of the key generation information 608 (and any acknowledgement thereof). The first network device 506a may be configured to receive the buffered packets 618 from the third network device 506n-1, decipher the buffered packets 618 using the cryptographic key generated via the key generation information 608, and perform network traffic regulation or control on the buffered packets 618. The first network device 506a may be configured to receive incoming packets and/or buffered packets 618 from local memory, decipher the packets using a cryptographic key generated via the key generation information 608, and perform network traffic regulation or control on the packets. In embodiments where the third network device 506n-1 generates the cryptographic key, the third network device 506n-1 may also receive incoming packets and/or buffered packets from its local memory, decipher the packets using the cryptographic key, and perform network traffic regulation and control on the packets. Hence, the first and third network device 506a, 506n-1 may each be configured to regulate network traffic using the cryptographic key generated via the key generation information 608 from the second network device 506n.

Figure 7:
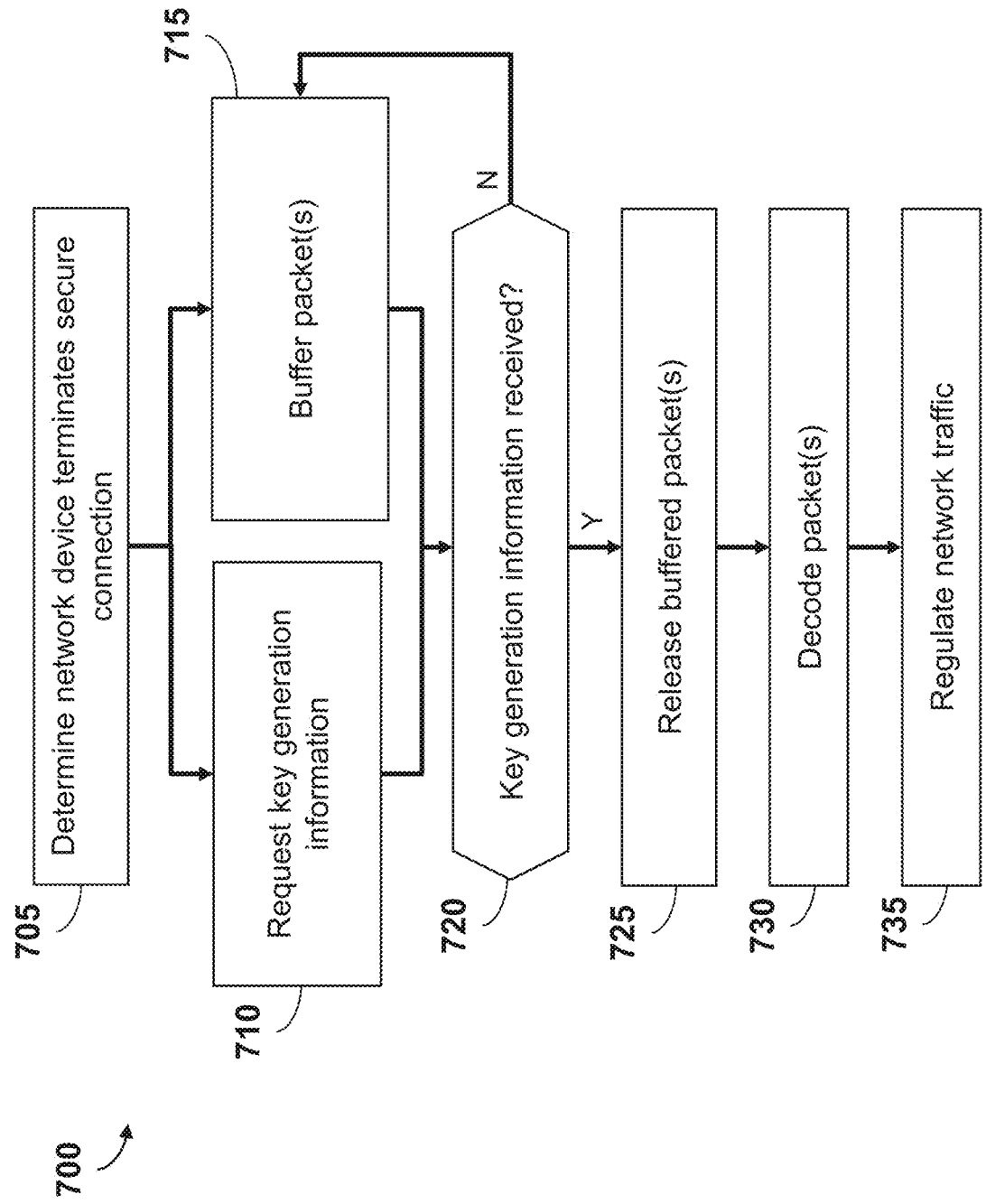
FIG. 7 is a flow diagram for a method for enhanced regulation of network traffic.

Referring now to FIG. 7, depicted is a flow diagram for a method 700 for enhanced regulation of network traffic. For instance, the method 700 can provide enhanced QoS, steering, and policy enforcement for HTTPS traffic via intelligent in-line path discovery of TLS terminating node. The functionalities of method 700 may be implemented using, or performed by, the components described in FIGS. 1-6, such as the network devices 506. In brief overview, a first network device may determine that a second network device terminates a secure connection (705). A third network device (and/or the first network device) may request key generation information from the second network device (710). The first network device and/or third network device may buffer packets (715). The first network device and/or third network device may determine whether key generation information is received (720). Where the key generation information is not received, the first network device and/or third network device may continue to buffer the packets (at 715). When the key generation information is received, the first network device and/or third network device may release the buffered packets (725). The first network device and/or third network device may decode the packet(s) (730). The first network device and/or third network device may regulate network traffic (735).

Referring to operation (705), and in some embodiments, the first network device may determine that a second network device terminates a secure connection. The secure connection may be terminated by the second network device rather than the server. The second network device terminates the secure connection by operating as one end of the secure connection (e.g., handling encryption and/or decryption of traffic for the secure connection). The second network device may decipher, decrypt, or otherwise decode packets delivered from the client device(s) to the server (e.g., using a decryption agent). Hence, decoding of packets may be performed by a device other than the server (e.g., the second network device using the decryption agent). In this regard, the second network device terminates the secure connection on behalf of the server (e.g., instead of the server handling encryption and/or decryption of the traffic). In some embodiments, the first network device and second network device may be in communication with one another. A secure connection may be established and can traverse through the first and second network device. The first network device and second network device may be located intermediary to a client device and a server.

The first network device may determine that the second network device terminates the secure connection via one or more means. For example, the first network device may determine that the second network device terminates the secure connection based on information from any form or type of packet, message or response elicited or received from the second network device and/or the client in the network. The first network device may determine that the second network device terminates the secure connection after, prior to or during establishment (e.g., during TCP handshake for the secure connection) of the secure connection. Hence, the secure connection can be established prior to, during or after the first network device seeks to determine if the second network device terminates the secure connection.

The first network device may determine that the second network device terminates the secure connection using TCP options of a packet (e.g., by setting TCP options). For instance, the first network device may set one or more TCP options in a packet (e.g., SYN packet) communicated to the second network device. The TCP options set by the first network device may include a flag, indication or trigger that corresponds to a request for information pertaining to the secure connection (that is being established or already established), such as whether the second network device is to terminate or terminates the secure connection, etc. The second network device may respond to the first network device by setting TCP options which indicate that the second network device terminates the secure connection. In some embodiments, the second network device may send a response (e.g., with or without setting particular TCP option(s)) when the second network device terminates the secure connection, and may not respond when the secure network device does not terminate the secure connection. In some embodiments, the secure network device may respond because the first network device and second network device are compatible (e.g., configured to interoperate according to preset TCP option(s), manufactured by the same manufacturer, designed to work together, are compatible, are functionally paired with one another, etc.). In this regard, the second network device may not necessarily respond to any network device (e.g., one that may not be compatible). Rather, the second network device may respond only to the first network device (and similar network devices) and/or particularly configured packet(s).

The first network device may determine the second network device terminates the secure connection based on the response received from the second network device. The second network device may generate TCP option settings indicating that the second network device terminates the secure connection rather than the server. The second network device may communicate a packet to the first network device (e.g., via the third network device) including the TCP option settings indicating the second network device terminates the secure connection. The first network device (and the third network device) may receive the packet and determine that the second network device terminates the secure connection based on the set TCP options.

Referring now to operation (710), and in some embodiments, the third network device and/or the first network device may request key generation information from the second network device. The third network device and/or the first network device may request the key generation information responsive to determining that the second network device terminates the secure connection. In some implementations, the third/first network device may request the key generation information following a handshaking between the third/first network device, and second network device. The handshaking may authenticate the parties (e.g., the first/third network device and second network device). Such implementations may increase security of the key generation information by verifying the identity of the third/first network device to the second network device (and vice versa). The third/first and second network devices may perform handshaking and exchange handshaking information via any protocol to establish trust.

By way of illustration, the third/first and second network devices may perform handshaking based on ownership of a public key. The second network device may output public keys. The public keys may be disseminated widely. Hence, any entity, computing device, etc., which possesses the public key may encrypt a message or data using the public key. The third/first network device may receive the public key. The third/first network device may deliver an encrypted message or data to the second network device to initiate a handshake. The message may be encrypted using the public key from the second network device. The second network device may maintain a private key which is used for decrypting messages. Upon receipt of an encrypted message from the third/first network device (e.g., within metadata accompanying a packet, within the header of a packet, etc.), the second network device may decrypt the message using the private key. The second network device and third/first network device may perform handshaking based on the contents of the decrypted message (e.g., successful decryption using the private key corresponding to the public key), based on the third/first network device using the public key to encrypt the message, etc.

By way of another example, the third/first and second network devices may perform handshaking based on ownership of a pre-shared key (PSK). Prior to exchanging any packets between the third/first and second network device, the second network device may communicate a pre-shared key to the third/first network device. The pre-shared key may include or correspond to a string of characters or dataset which may be used as a validation key. The third/first and second network devices may generate and exchange hash values based on the pre-shared keys. Following exchanging of the hash values (e.g., within metadata accompanying a packet, within the header of a packet, etc.), the third/first and second network devices may perform handshaking to establish trust.

As another example, the third/first and second network devices may perform handshaking based on a parameter uniquely associated with the second network device. The second network device may provide the parameter (e.g., a unique identifier, a pin, a token, etc.) to the first network device. The second network device may provide the parameter to the third/first network device at enrollment (e.g., when the third/first network device registered with the second network device, for instance). The second network device may maintain a list or database of parameters and their corresponding network devices. The third/first network device may deliver information corresponding to the parameter (e.g., the parameter itself, a hash value associated with the parameter, etc.) to the second network device. The third/first network device may deliver the information corresponding to the parameter to the second network device within metadata accompanying a packet, within the header of a packet, etc. The second network device may cross-reference the information corresponding to the parameter with stored information (e.g., the list of parameters and network devices maintained by the second network device). The third/first and second network device may establish trust through sharing of the proper parameter.

In some embodiments, the third/first network device may establish a secure channel between the third/first and second network devices following the handshaking. The secure channel may be similar to the secure connection described above. In some embodiments, the secure channel may be a limited communications link (e.g., to securely communicate or share the key generation information). The secure channel may be similar to a secure connection, which may be or include an HTTPS connection, a TLS connection, or an SSL connection. The secure channel may be used for exchanging communications between the second and third network devices.

Following handshaking and establishment of trust (e.g., resulting in the establishment of a secure channel), the third/first network device may request the key generation information from the second network device. In some embodiments, the third/first network device may request the key generation information from the second network device by exchanging encrypted messages (e.g., using the public key or pre-shared key described above) with the second network device.

In some embodiments, the first network device may receive the key generation information via the third network device. The third network device may be intermediary between the first network device and second network device. The secure connection may traverse through the third network device and first network device. In various embodiments, the first or the third network device may generate a request for the key generation information to communicate to the second network device. For instance, the first network device may send the request to the third network device. The third network device may receive the request and can send the request to the second network device to request the key generation information, responsive to receiving the request from the first network device.

Referring now to operation (715), and in some embodiments, the first network device and/or the third network device may buffer packets. In some embodiments, the first network device and/or the third network device may receive and intercept packets communicated across the secure connection. The first network device and/or the third network device may hold data packets (e.g., packets other than handshake packets) for transmission via the secure connection until the key generation information requested at operation (710) is received, or a time-out event occurs. The first network device and/or the third network device may buffer packets responsive to providing the request for the key generation information received from the first network device to the second network device. The first network device and/or the third network device may buffer packets by storing the buffered packets in local memory for the corresponding network device.

In some embodiments, the first network device and/or the third network device may temporarily buffer or hold some packets from being communicated across the secure connection, and may permit transmission of other packets communicated across the secure connection. The first network device and/or the third network device may include a packet buffer agent and packet transfer agent. The packet buffer agent and packet transfer agent may identify information in the headers of the packets, and may selectively buffer or transfer packets based on information extracted from their headers. The information in the headers may indicate whether the packets contain or include handshake information (e.g., data or information used for performing the handshake for establishing the secure channel). The packet transfer agent may transfer packets between the first and second network devices which include handshake information. The packet buffer agent may buffer packets which do not include handshake information. The packet buffer agent may buffer packets in local memory for the third network device until the first network device receives the key generation information or a timeout event occurs (e.g., a timeout of the secure connection or a timeout of the secure channel).

Referring now to operation (720), and in some embodiments, the third network device may determine whether the key generation information is received (e.g., successfully by the first network device). In some embodiments, the third network device may determine that the key generation information is received when the third network device receives an acknowledgement message from the first network device indicating receipt of the key generation information. When the third network device determines that the first network device received the key generation information, the method 700 may proceed to operation (725). The method 700 may loop between operation (715) and (720) such that the third network device buffers packets until the first network device receives the key generation information (or a timeout event occurs). In some embodiments, when a timeout event occurs, the method 700 may proceed to operation (725). In some embodiments, when a timeout event occurs, the third network device may purge, delete or remove the buffered packets stored in local memory for the third network device.

In some embodiments, the third network device may receive the key generation information from the second network device. The third network device may receive the key generation information through the secure channel between the second and third network device. The third network device may send the key generation information from the third network device to the first network device. In this regard, the first network device may receive key generation information of the secure connection (indirectly) from the second network device. The first network device may obtain or receive the key generation information responsive to determining that the second network device terminates the secure connection.

In some embodiments, the first network device may acknowledge receipt of the key generation information from the third network device. The first network device may generate an acknowledgement message, and send the acknowledgement message to the third network device. The third network device may receive the acknowledgement message from the first network device and determine that the first network device successfully received the key generation information from the second network device via the third network device.

The first network device may assemble, create, establish, or otherwise generate a cryptographic key using the key generation information. The key generation information may correspond to a cryptographic context, and may specify or include instructions, an algorithm, protocol, etc., for generating the cryptographic key according to a cryptographic algorithm. The first network device may generate the cryptographic key for decoding, decrypting, interpreting, or otherwise analyzing the packets delivered across the secure connection between the server and client device(s). Hence, packets (e.g., destined for the client) may be encrypted and packets (e.g., destined for the server) may be decrypted by the second network device using a cryptographic key generated via the key generation information. The first network device may intercept packets (e.g., destined for the server), and may decrypt those packets using the cryptographic key generated via the key generation information. The cryptographic keys used by the first network device and second network device may be similar or compatible in at least some aspects.

In some embodiments, the third network device may assemble, create, establish, or otherwise generate a cryptographic key using the key generation information. The third network device may generate the cryptographic key for decoding, decrypting, interpreting, inspecting, or otherwise analyzing the packets delivered across the secure connection between the server and client device(s). In some embodiments, the third network device may intercept packets (e.g., destined for the client), and may decrypt those packets using the cryptographic key generated via the key generation information. The third network device may intercept packets outgoing from the server side (e.g., to perform traffic management or optimization of traffic destined for the client), and the first network device may intercept packets outgoing from the client side (e.g., to perform traffic management or optimization of traffic destined for the server). The cryptographic keys used by the first, second, and third network devices may be similar or compatible in at least some aspects.

At operation (725), and in some embodiments, the first network device and/or third network device may release the buffered packets for inspection. In some embodiments, the first network device and/or third network device may release the network traffic (e.g., the buffered packets) which was held for transmission until the key generation information is received (e.g., at operation 715) or the timeout event occurs. For instance, the third network device may release the buffered packets when the third network device determines that the first network device received the key generation information, and/or when the third network device received the key generation information (and can decrypt and inspect its buffered packets). In some embodiments, the third network device may release some buffered packets when the third network device receives an acknowledgement message from the first network device. In certain embodiments, the third network device may release the buffered packets when the third network device delivers the key generation information to the first network device. The third network device may release certain buffered packets for decoding and delivery to their intended destination, as described in greater detail below. For instance, where a packet was originally destined for a client device prior to being intercepted and buffered by the third network device (e.g., at operation 715), the third network device may release the packet, decode the packet (at operation 730), and send the packet to the client device (at operation (735), as described in greater detail below.

At operation (730), and in some embodiments, the first network device and/or third network device may decode (e.g., decipher, decrypt and/or inspect) the released packets. In some embodiments, the first network device may decode the packet(s) of the secure connection destined for the server. The first network device may decode the packet(s) using the received key generation information. The first network device may decode the packets for regulating, improving and/or managing network traffic of the secure connection at the first network device. The first network device may decode the packets using the key generation information (e.g., by using the cryptographic key generated via the key generation information). The first network device may decode the packets to determine, for instance, a URL associated with the packets, content of the packets, a source of the packets, a destination of the packets, etc. The first network device may identify such information in the header of the packets, the payload of the packets, etc. The first network device may use the information identified in the decoded packets to regulate, improve and/or manage network traffic. Similarly, the third network device may decode the packet(s) of the secure connection destined for the client device for instance. The third network device may decode the packet(s) using the received key generation information. The third network device may decode the packets for regulating, improving, and/or managing network traffic of the secure connection at the third network device.

At operation (735), and in some embodiments, the first network device (and/or third network device) may regulate (e.g., improve, control, optimize and/or manage) network traffic. The first network device (and/or third network device) may perform policy-based regulation of the network traffic. In some embodiments, the first network device (and/or third network device) may regulate network traffic based on, at least, information obtained from packets decoded using the key generation information (e.g., the cryptographic key generated via the key generation information). The first network device (and/or third network device) may perform packet filtering or steering (e.g., transmission route, priority and/or time adjustment or optimization) responsive to inspecting the decoded packet(s). The first network device (and/or third network device) may identify information, such as URLs, content, source, destination, etc., of the packets responsive to decoding the packets. The first network device (and/or third network device) may perform packet routing changes or optimization by identifying the destination of the packet, and steering, re-routing, optimization of the network path, etc. for the packet. The first network device may perform packet filtering and/or steering based on application of one or more policies to the decoded and inspected packets.

The policies may indicate that certain types of information (and corresponding packets) are not to be delivered to certain client devices. For instance, where a low-level employee requests on their client device confidential or secure information from a service to which they do not have access and the service attempts to deliver such information in a packet, the first network device may apply the policies to the packet and determine that the client device is not authorized to access that information. The first network device may block the packet or re-route the packet to a different client device (e.g., a client device associated with a cyber-security officer, a higher-level employee, an IT administrator, etc.). In some embodiments, the first network device may purge, destroy, block or otherwise filter the packet responsive to determining the client device cannot access the packet (e.g., rather than re-routing the packet to the requesting entity).

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method comprising
identifying, by a first device, that a second device terminates a secure connection traversing through the first device;
receiving, by the first device responsive to the identification of the termination of the secure connection by the second device, information from the second device, the information enabling decipherment of encrypted traffic of the secure connection;
using, by the first device, the received information to decipher a packet of the encrypted traffic; and
managing, by the first device, the packet responsive to deciphering the packet using the received information.

2. The method of claim 1, wherein the first device and the second device are intermediary to one or more clients and one or more servers.

3. The method of claim 2, wherein communications between at least one client and at least one server is communicated over the secure connection via the first device and the second device.

4. The method of claim 1, wherein the secure connection traverses the first device by at least communications of establishment of the secure connection between at least one client and at least one server being communicated via the first device.

5. The method of claim 1, further comprising generating, by the first device using the received information, a cryptographic key to decipher the packet.

6. The method of claim 1, wherein the identification of the second device as terminating the secure connecting occurs during a handshake to establish the secure connection.

7. The method of claim 1, further comprising setting, by the first device, a value in a field of one or more packets used to establish the secure connection to cause the second device to provide the information to the first device.

8. A device comprising:
one or more processors, coupled to memory and configured to:
identify that another device terminates a secure connection traversing through the first device;
receive, responsive to the identification of the termination of the secure connection by the another device, information from the another device, the information enabling decipherment of encrypted traffic of the secure connection;
use the received information to decipher a packet of the encrypted traffic; and
manage the packet responsive to deciphering the packet using the received information.

9. The device of claim 8, wherein the device and the another device are intermediary to one or more clients and one or more servers.

10. The device of claim 9, wherein communications between at least one client and at least one server is communicated over the secure connection via the device and the another device.

11. The device of claim 8, wherein the secure connection traverses the device by at least communications of establishment of the secure connection between at least one client and at least one server being communicated via the device.

12. The device of claim 8, wherein the device is further configured to use the received information to generate a cryptographic key to decipher the packet.

13. The device of claim 8, wherein the identification of the second device as terminating the secure connecting occurs during a handshake to establish the secure connection.

14. The device of claim 8, wherein the device is further configured to set a value in a field of one or more packets used to establish the secure connection to cause the another device to provide the information to the device.

15. A system comprising
- a first device in communication with a second device at which a secure connection used by one or more clients to communicate with one or more servers is terminated, the secure connection traversing through the first device; and
- wherein the first device is configured to:
- receive, responsive to determining that the second device terminates the secure connection, information from the second device, the information enables decipherment of encrypted traffic of the secure connection;
- use the received information to decipher a packet of the encrypted traffic; and
- manage the packet responsive to deciphering the packet using the received information.

16. The system of claim 15, wherein the first device and the second device are intermediary to the one or more clients and the one or more servers.

17. The system of claim 16, wherein the first device is further configured to use the received information to generate a cryptographic key to decipher the packet.

18. The system of claim 16, wherein the first device is further configured to determine that the second device terminates the secure connecting during a handshake, traversing the first device, to establish the secure connection.

19. The system of claim 16, wherein the secure connection traverses the first device by at least communications of establishment of the secure connection between at least one client and at least one server being communicated via the first device.

20. The system of claim 16, wherein the first device is further configured to set a value in a field of one or more packets used to establish the secure connection to cause the second device to provide the key generation information to the first device.

* * * * *